US006079703A

United States Patent [19]

Chavez, Jr.

[11] Patent Number: 6,079,703

[45] Date of Patent: Jun. 27, 2000

[54] CLAMPING/SECURING/CONNECTING SYSTEM

[76] Inventor: Alex Benjamin Chavez, Jr., 6250 N. Federal Blvd., #99, Denver, Colo. 80221

[21] Appl. No.: 08/953,349

[22] Filed: Oct. 17, 1997

[51] Int. Cl.[7] ........ B23Q 3/02

[52] U.S. Cl. ........ 269/147; 269/166; 269/203; 269/283; 269/305

[58] Field of Search ........ 29/559; 269/305, 269/900, 166, 283, 139, 147, 203

[56] References Cited

U.S. PATENT DOCUMENTS

| | | | |
|---|---|---|---|
| 4,125,251 | 11/1978 | Jamieson, Jr. | 269/900 X |
| 4,386,767 | 6/1983 | Dyckes et al. | 269/147 X |
| 4,509,731 | 4/1985 | Schaal et al. | 269/900 X |
| 4,583,724 | 4/1986 | Huang | 269/283 X |
| 4,867,427 | 9/1989 | Cunningham | 269/900 X |
| 5,022,137 | 6/1991 | Sorensen et al. | 29/559 |
| 5,513,838 | 5/1996 | Van Rossum | 269/203 |
| 5,553,838 | 9/1996 | Lee | 269/900 X |
| 5,568,915 | 10/1996 | Raymond | 269/147 |
| 5,586,754 | 12/1996 | Williams | 269/147 X |

OTHER PUBLICATIONS

Black and Decker "Work Mate".

*Primary Examiner*—Joseph M. Gorski
*Attorney, Agent, or Firm*—Sheridan Ross P.C.

[57] ABSTRACT

This is a system/method of clamping or securing or connecting one or more objects together in a wide variety of ways with the main means being a specifically designed bar and mated slot combination. While the main embodiment is the "Handy Table" project, there are many other ramifications of this invention. The bar and slot design can be altered to perform many other tasks where some way of attaching one or more objects to another need be accomplished. The main embodiment is, in my estimation, the most advanced type of work or project surface. The combination of a tri-sectional work surface, adjustable in a variety of ways, in size, in tilting, in multi-angle clamping capability, in precision height adjustment, and in the ability to transport the object being worked on easily, plus the addition of accessaries that enhance the overall capabilities of the "Handy Table", make it useable by many different professions and by the average project worker, be it man or woman, young or old.

6 Claims, 25 Drawing Sheets

FIG. 3A
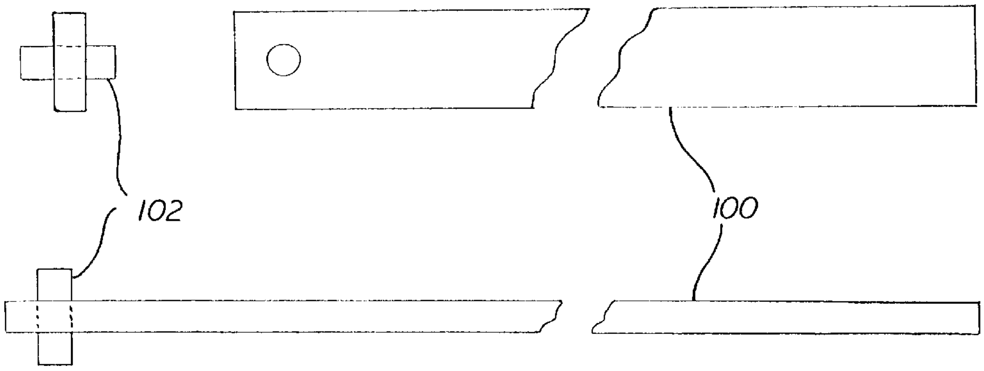
FIG. 3B
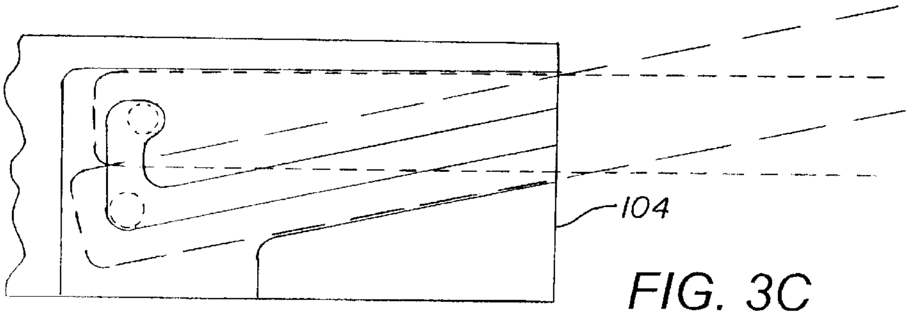
FIG. 3C
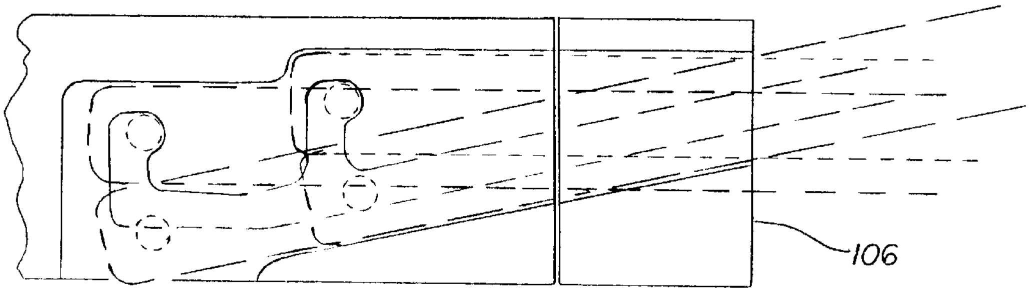
FIG. 3D

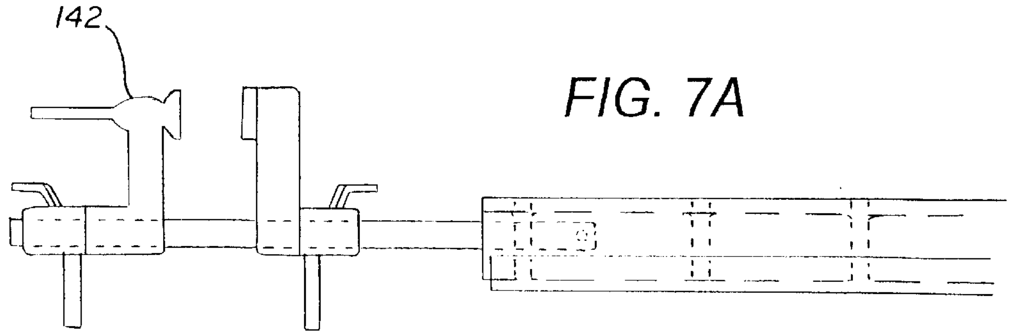
FIG. 7A
FIG. 7B
FIG. 7C
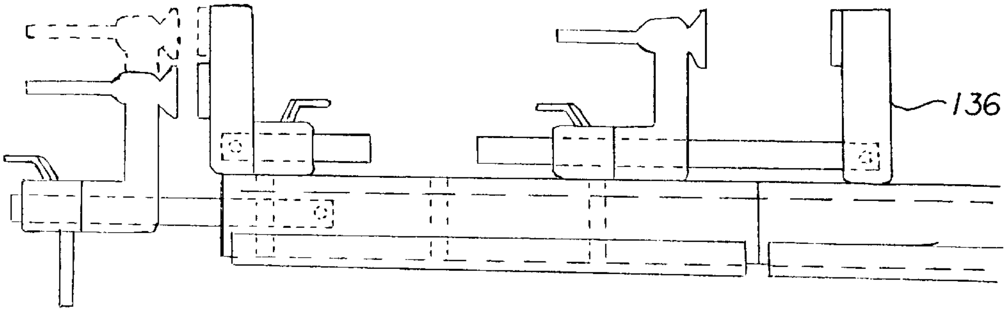
FIG. 7D
FIG. 7E
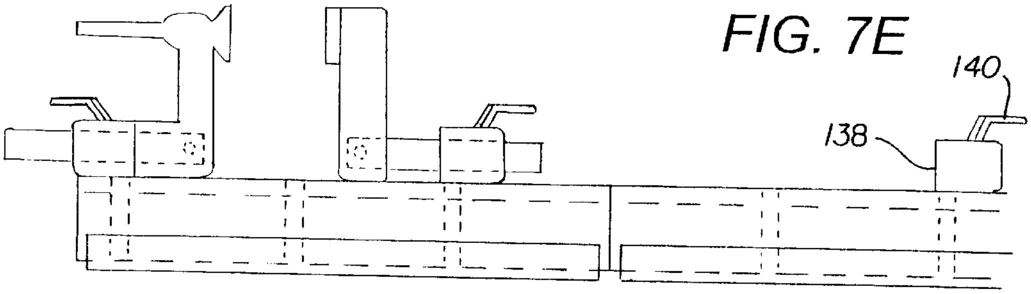
FIG. 7F
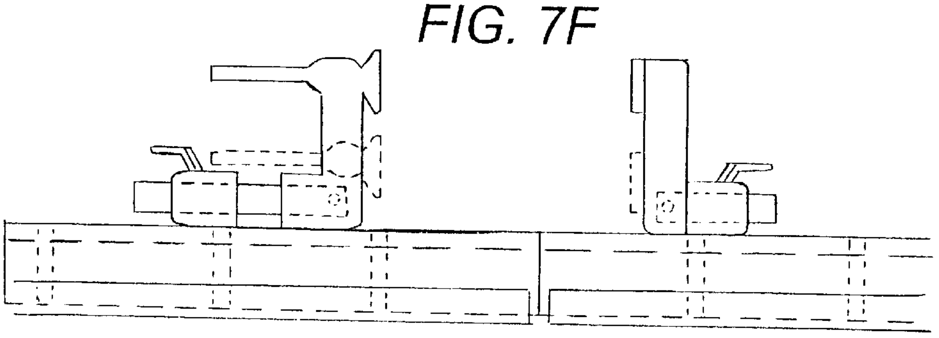

FIG. 9A
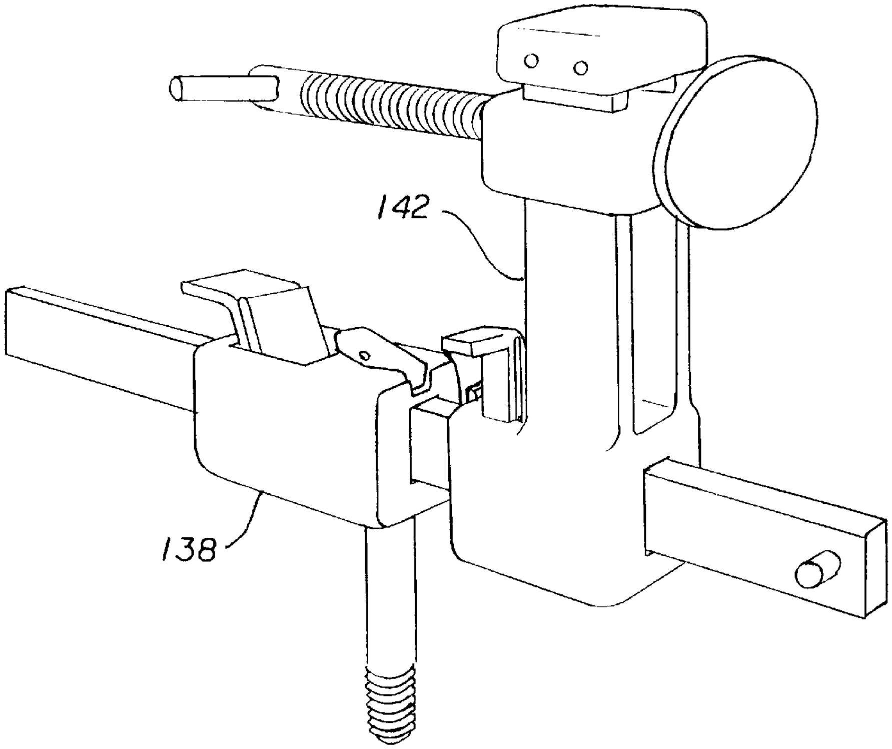
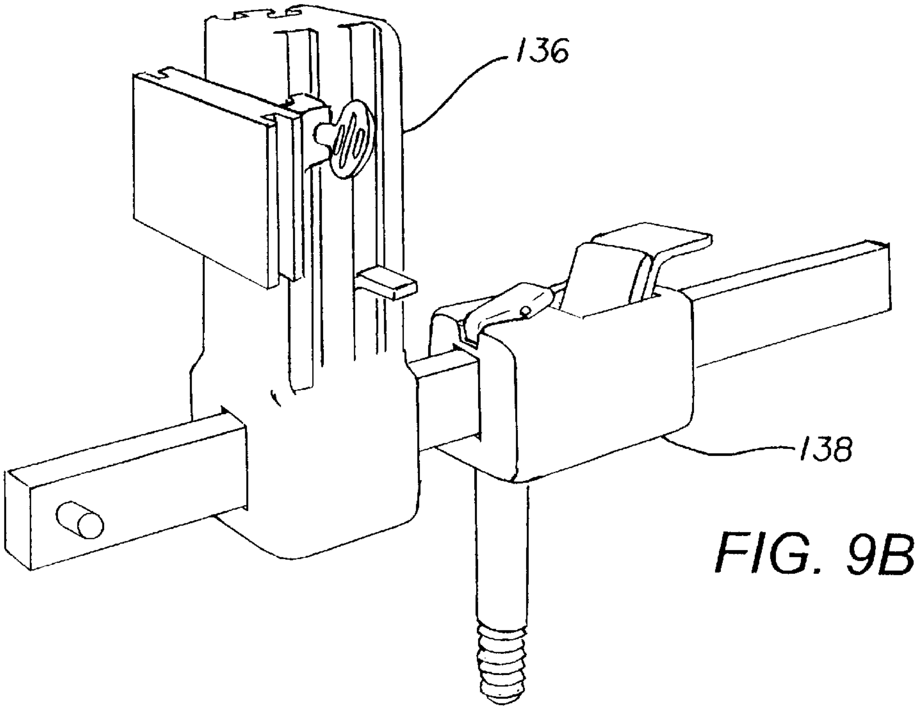
FIG. 9B

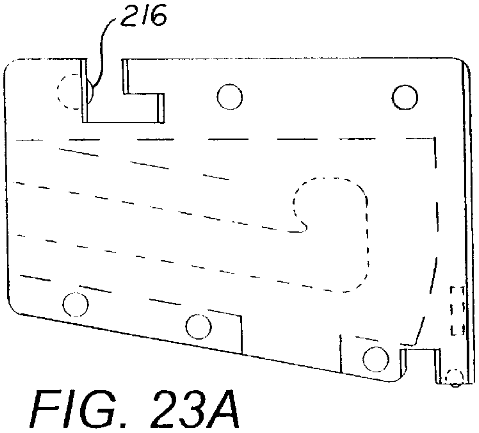
FIG. 23A
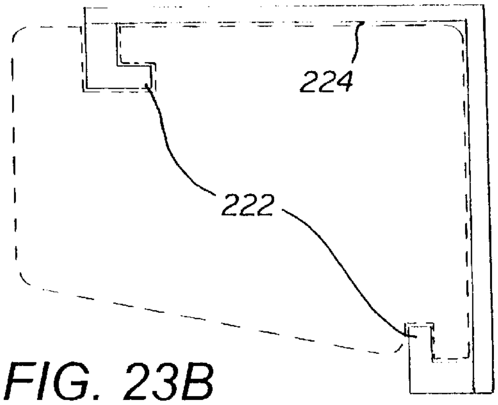
FIG. 23B
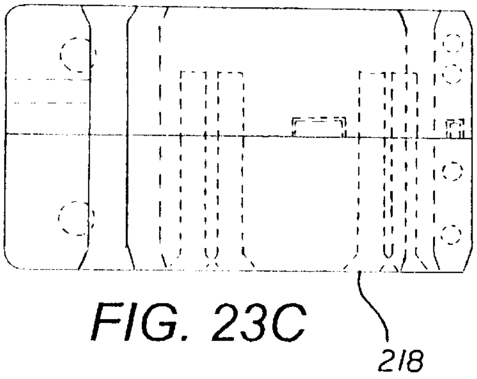
FIG. 23C
FIG. 23D
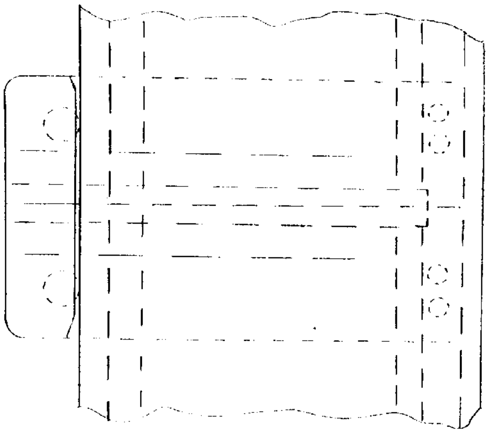
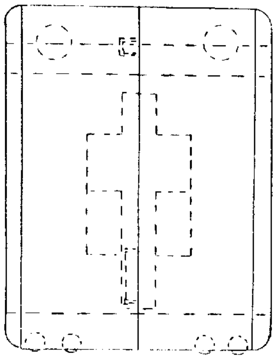
FIG. 23E
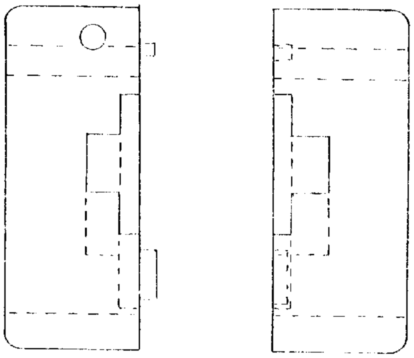
FIG. 23F

CLAMPING/SECURING/CONNECTING SYSTEM

BACKGROUND

1. Field of Invention

This invention is related to, (but not limited to), devises and/or systems used in industry, construction, production, building or repairing trades, and in home project application. Although there are many other ramifications of the invention, I will center on a specific area; this area being products/tools such as work surfaces, clamps, or other physical aide devises used to assist people in their tasks when a "helping hand" isn't available. While the main embodiment will address a system designed for a combination of a clamping components and a work surface, there is a wide variety of application just in this area.

2. Prior Art (Relating to Main Embodiment)

There are many products available to the consumer that deal with securing an object to another or to a work surface, or both. In 20 plus years of experience in construction, remodeling, woodworking shops, and personal home projects, I have seen and used a wide variety of work surfaces and clamps. I've also had first hand experience as to their limitations. Most are limited in their function and size; the better ones out of the average home owner's price range. Some work surfaces have a clamp/vise incorporated into their product. The securing devise being fixed in one specific place limits the capability of-the product and the user. As for other clamping devises such as bar clamps, "C" clamps, pipe clamps, toggle clamps, "Quick Grips", etc., often they get in the way of other clamping needs, limiting the amount of objects that can be clamped while working on a surface. Because portability is limited, a project being worked on usually has to set where it's at until it is finished. It's simply in the way at this point. While no one product can "do it all", there is room for improvement in all these areas.

One particular prior art I will address as an example is the "Black and Decker 'Work Mate'". This product has two different height adjustments only. It has one way of clamping. Because of the way the "Jaws" work, the work surface is pretty much tied up. The "jaws" open to only 5¼ inches. It is portable, but only when folded up, otherwise it would take two people to move the product around, if it needs moving while an object of considerable size is clamped to it. In a way, it can be refered to as a fancy saw horse with a vise and very little more.

OBJECTS AND ADVANTAGES

Accordingly, several objects and advantages of my invention are;

1. The capability of providing a multitude of securing positions. The design of top and side mounted clamping provides well over 100 combinations within a 4.6 square foot area. There will be a variety of accessaries that will enhance this.
2. The center section of my invention has the capability of rotating 360 degrees and locking at a specific degree or at pre-set positions for securing a 3, 4, 5, 6, or 8 sided object. This improvement is above those surfaces that offer no specific variations in direction for an object being worked on. This clamping feature is great for creating octagonal table bases, 5 sided door frames, various angled window frames, or any other object a creative mind can come up with.
3. The left and right sides of the work surface can extend out away from the center circle to lengthen the work surface. Also, the right or left side can be removed together or independently to allow for a different use.
4. The clamping devises can become part of the work surface as well as independent bar clamps. The clamp faces can also adjust in height for a shallow object to be clamped. The versatility of the clamp designs can enable them to to become toggle or "C" clamps.
5. The frame of the work surface can be tilted a full 90 degrees and locked anywhere in between. This feature allows some projects to be rolled over to a drill press for complex drilling angles. This also allows for an object being worked on to be moved from a side position to a top position, (and vice-verse), without unclamping the object. Another use of this feature is the use of the invention as a way to carry sheets of drywall or other sheet goods, (with an accessary devise), from one room to another or even from the store at purchase time.
6. The adjustable legs of the work surface enable height adjustment from 26⅝" to 39" and anywhere in between. The legs can also be adjusted independently from each other. (Height adjustment figures may vary slightly.) 7. The swivel locking casters have a total 600 lb. capacity enabling heavy objects to be moved easily. Of course there will be testing done on a working model to set tolarances and guidelines for use as well as safety precautions. Some of these will be discussed later.

Further objects and advantages of this invention will become apparent from a consideration of the drawings and ensuing description. It will also become apparent that prior arts are limited in many ways compared to this product I seek to patent. There are also other ramifications of the bar and slot design which is the basis of this patent. These will be discussed later along with shop model applications, smaller in home models that can set on a table, and a variety of other ways to use the bar and slot design.

DRAWING FIGURES

I now give a description of the drawing figures. These will be primarily of the main embodiment. There will also be a few drawings of a variation of the invention designed to be used in a manufacturing shop or other similar business.

FIG. 1

This is a three dimentional view, from the front and slightly above, of the main embodiment of the invention. In this view the clamping devises are not shown. They will be presented in later drawings.

FIG. 2

This is also a three dimentional view but from the back and slightly below the work surface. I will, for now, call this embodiment the "Handy Table".

FIG. 3

This figure shows the bar and slot. This is the basis of the invention. The "Handy Table", the shop application, and the smaller version will be discussed later.

FIG. 4

This shows the work surface as it would look in an expanded position. It also shows the work surface frame and the turn table, which allow for the adjustability and special movement of the work surface.

FIG. 5

This view is meant to show the network of the left side of the work surface, (the position shown). It is shown as if the surface is transparent, as if you are looking right through the top. If you were to turn this piece around 180 degrees, it can be the right side of the work surface. This was designed this way to cut manufacturing costs.

FIG. 6

Again, this view is designed to show the center section network as if viewed through a transparent top. Also shown is a detail of clamp unit holes and slots which house the clamping units.

FIG. 7

Pictured are a few of the ways the clamp units can be used with the work surface. These adapt from surface to side easily.

FIG. 8

This shows some clamping positions for the center section.

FIG. 9

A 3-D view of three clamp units. (A) is unit #142. (B) is unit #138. (C) is unit #136. The second sheet of FIG. 9 is a detail of clamp unit #138 which is like the "hub" of the clamp pieces. I call this the "common" unit.

FIG. 10

Pictured is a one piece clamp unit. This is unit #144. This has a greater height adjustment than the other clamp units. This design is for use around the perimeter of the work surface. It does not combine with the other units, but works with them.

FIG. 11

This is a side, back, and top view of clamp unit #142.

FIG. 12

This shows a side, front, and top view of clamp unit #144.

FIG. 13

This is a side, front, and top view of clamp unit #136. Also shown are four views of the unique clamp face that goes with it. Items #156 A, an inside corner, and B, an outside corner adapter are accessary parts. Item #150 is two views of the slide lock. These pieces, one on each side of clamp units #142 and #136, secure these units to a clamp bar.

FIG. 14

We now get to the work surface frame and its operating parts. Pictured is the work surface frame. A top view and a front side view are used. In between this is the turntable. There are four levers in the work surface frame controling three different functions. Two levers control the left and right extending of work surface, (or removal of either or both as neccessary), one lever for control of the center section, and the fourth lever for the lock and release of the tilt function.

FIG. 15 and 16

These are sectional views of the levers in the work surface frame. FIG. 15 being the tilt lock/release lever and FIG. 16 being the left/right sections extending levers.

FIG. 17

This is a sectional view of the center section lever, and the locking pin lever.

FIG. 18

This is a three dimentional view, from the back, of the upper frame work that the work surface frame attaches to. The broken lines are of the work surface frame raised above the upper frame work. FIG. 19 will show how this attaches and tilts.

FIG. 19

This is a side view of the upper frame work. The work surface frame is attached, and the broken line illustrations show the work surface frame in full 90 degree tilt. Also shown is the movement of the air spring and its attachment to the work surface frame and the upper frame work.

FIG. 20

This figure shows the legs that attach to the upper frame work. The horizonal assembly is also adjustable. Casters) and legs that crank up and down may be an option. For now I want to have these included in the invention structure.

FIG. 21

I return to the work surface here in order to show the options of the center section and how it can work independently, with the right section alone, with the left section alone, or with the entire surface as a unit. I use the exploded view in order to show the degree numbers which are on the side of the center section, and on the top, around the perimeter.

FIG. 22

While this figure and the next are not part of the main embodiment, they are a representative of a variation of the invention. This shows how the invention can be used in a shop application; a wood or furniture shop, an assembly shop, etc. This embodiment involves less variety, but is still more versatile that standard clamping procedures. The slot and bar is still prominent but the use of a track is incorporated. Also shown is a counter part to clamp unit 138, (pictured in FIG. 7), This counter part can be placed anywhere the work surface will allow. All that is needed is a hole drilled in a place where there is a 3 inch radius clearance and the track can be secured to the overhang of a table and to the vertical "strong back", common to most work surfaces. Tracks can be cut to any length.

FIG. 23

FIG. 23-A shows the side view of the slot unit.

23-B shows the sectional view of the track and the broken line shows how the slot unit fits into the track.

23-C shows a top view of the slot unit, in 2 halves, the ball bearings the track rolls on, and the grooves the track slides in.

23-D shows the slot unit, top view, in the track.

23-E shows the back side of the slot unit. The ball bearings on the bottom are smaller than the horizonal ball bearings at the front of the unit because they slide in the track itself. The "front" ball bearings slide on the outside of the track.

23-F shows the opening of the slot unit, (seperated), and the hole for the thumb screw which will lock unit at desired place. After FIG. 23, I included two items that I thought would be of some value to the examiner.

Figure 5:
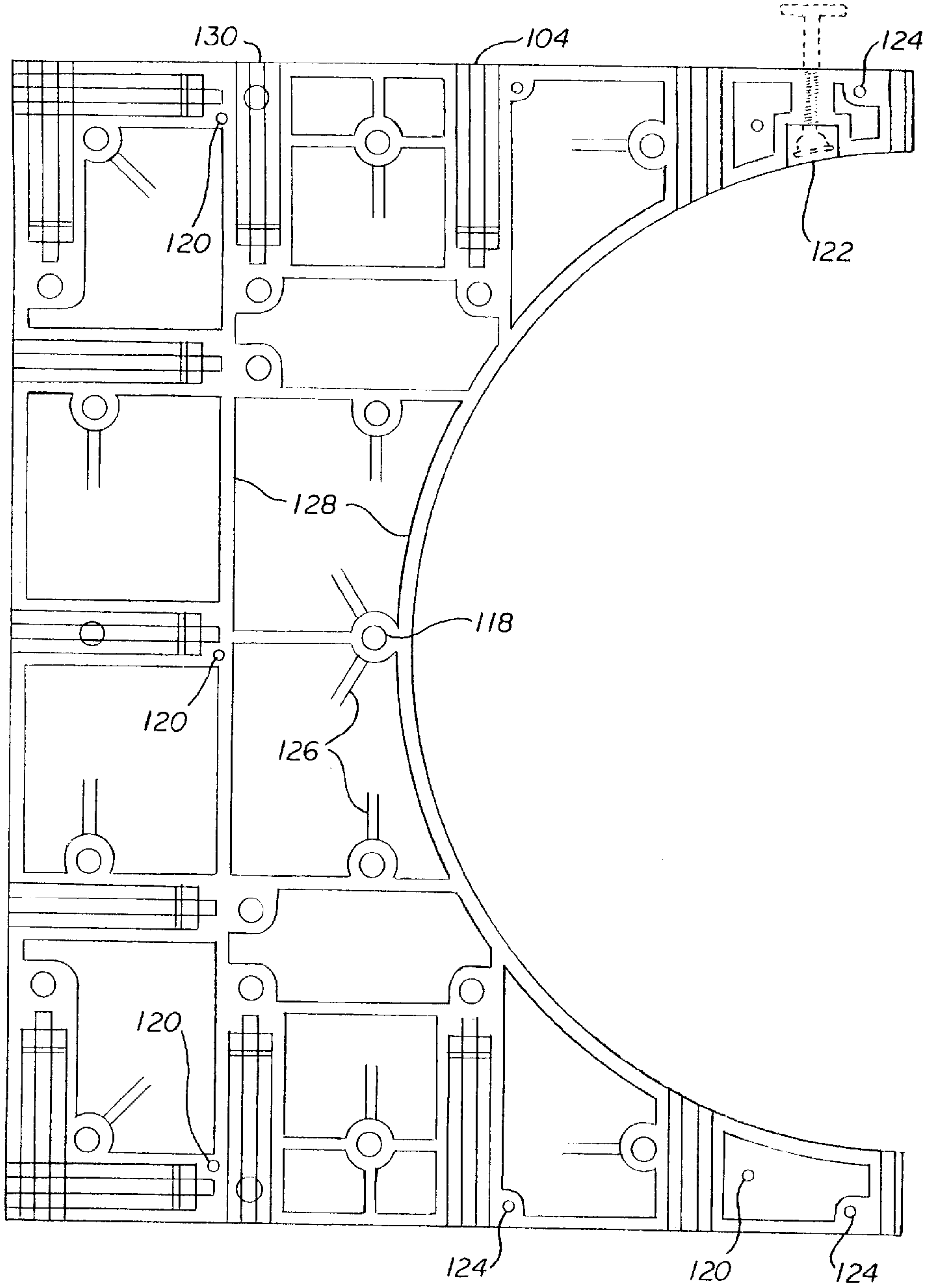
Figure 6:
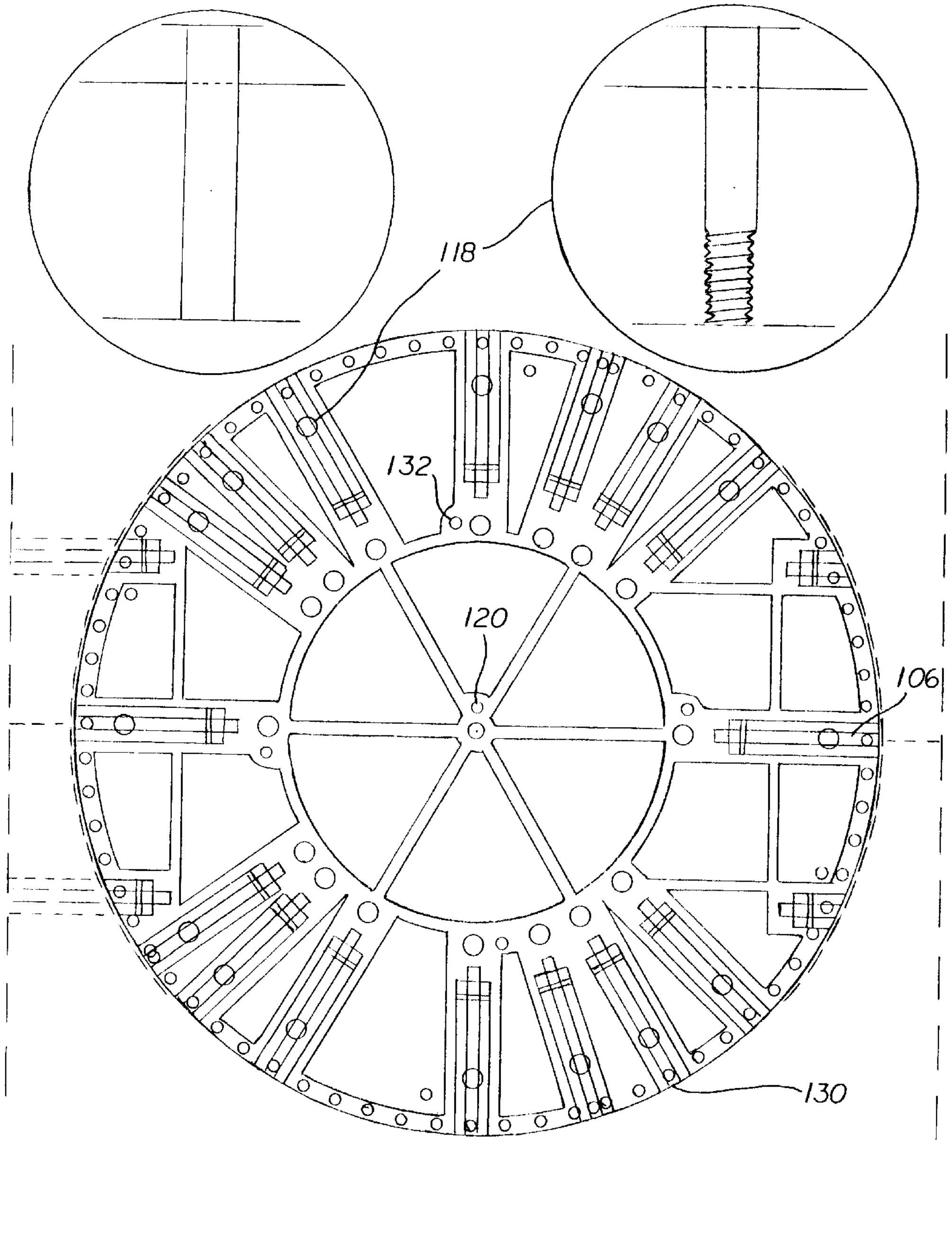
Figure 8:
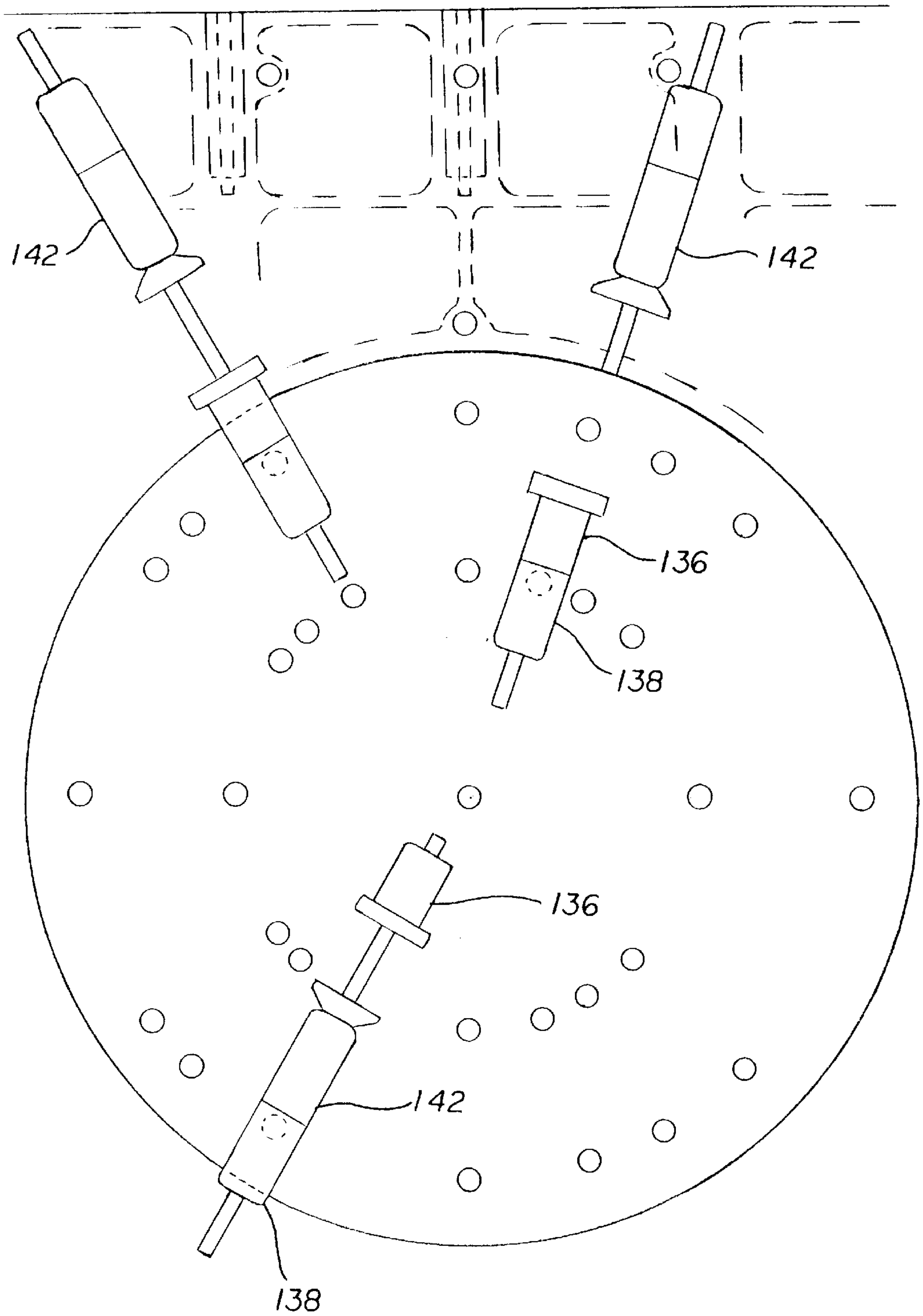

The reason I chose to use the "transparent views as in this item and in the FIGS. 5 and 6 is because it seemed less confusing to the few people I trusted to discuss this with.

REFERENCES NUMERALS IN DRAWINGS

This list will designate a certain number to a specific part or item presented in the "figures". Following the number will be the part or item. The right column will tell which figure they appear on as they are significant. Some reference numerals will appear in more than one figure. Since my figures number in double digits, I will start the referance numerals with "100".

| Ref. # | Item or Part | location (FIG.) |
|---|---|---|
| 100 | clamp bar | 3 |
| 102 | roll pin (spring pin) (¼ × ¾) | 3 |
| 104 | single slot | 3-C |
| 106 | dual slot | 3-D |
| 108 | left section | 4 |
| 110 | right section | 4 |
| 112 | center section | 4 |
| 114 | turntable | 4 |
| 116 | work surface frame | 4 |
| 118 | clamp unit holes | 5 |
| 120 | particle board mounting holes | 5 |
| 122 | center section random lock | 5 |
| 124 | left/right section extension lock holes | 5 |
| 126 | stress brace | 5 |
| 128 | webbing | 5 |
| 130 | single slot w/clamp unit hole | 5 |
| 132 | turntable mounting holes | 6 |
| 134 | 5 degree increment locking holes | 6 |
| 136 | clamp unit | 7-C |
| 138 | clamp unit | 7-E |
| 140 | bar lock for clamp unit | 7-E |
| 142 | clamp unit | 7-A |
| 144 | clamp unit | 7-B |
| 146 | clamp face | 11 |
| 148 | roll pin (⅛ × 1) | 11 |
| 150 | slide lock (from clamp unit to bar) | 11 |
| 152 | clamp unit coupler | 11 |
| 154 | clamp face (for 118 unit) | 13 |
| 156 | A-female corner adapt. B-male corner adapt. | 13 |
| 158 | left section extension lever | 14 |
| 160 | tilt lock/release lever | 14 |
| 162 | right section extension lever | 14 |
| 164 | 5 degree increment lock lever | 14 |
| 166 | 5/16 crank rod (typical of work surface frame) | 14 |
| 168 | tilt lock plunger | 14 |
| 170 | tilt lock plunger handle | 14 |
| 172 | 5 degree increment locking pin (pivot arm) | 14 |
| 174 | ⅜ crank rod | 18 |
| 176 | tilt crank handle | 18 |
| 178 | height adjustment lever | 18 |
| 180 | 14 ga. crossmember panel | 18 |
| 182 | support bracket (for air spring and gear) | 18 |
| 184 | air spring | 18 |
| 186 | 1" × 3" upper leg sleeve | 18 |
| 188 | crank rod bracket | 18 |
| 190 | curved rack gear | 18 |
| 192 | pinion gear | 18 |
| 194 | tilting rod lock | 18 |
| 196 | aluminum alloy leg | 20 |
| 198 | floor glide | 20 |
| 200 | caster bracket | 20 |
| 202 | lower leg sleeve | 20 |
| 204 | turntable degree view window | 21 |
| 206 | degree indicator | 21 |
| 208 | bar slot unit (or housing) | 22 |
| 210 | under surface clamp mount base | 22 |
| 212 | bar slot unit track | 22 |
| 214 | horizonal track ball bearings | 23-A |
| 216 | vertical track ball bearings | 23-A |
| 218 | screw holes | 23-C |
| 220 | interlock tabs and grooves | 23-F |

Note; All specific dimensions and/or measurements that will be quoted in this patent application are subject to change. The reason my be because of availability of parts from manufacturers and because of slight changes needed to be made in the parts that will need to be molded, casted, or manufactured. page 13

DESCRIPTION OF THE INVENTION

Figure 1:
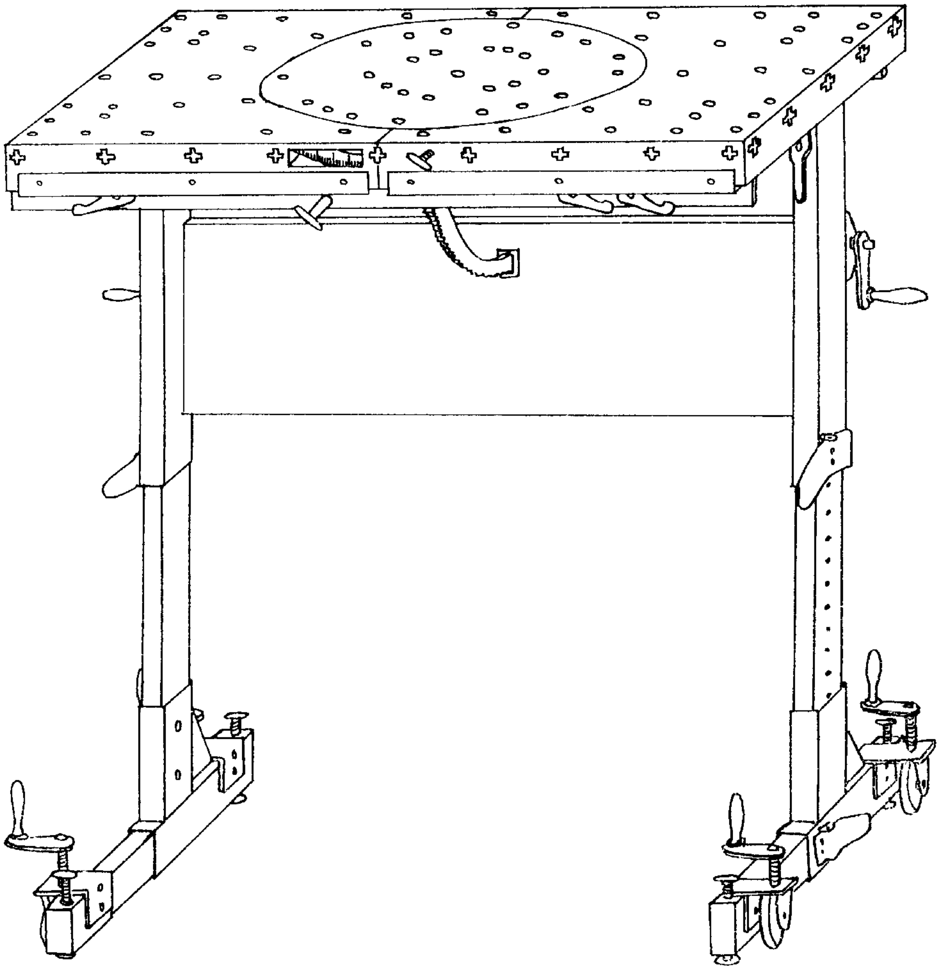

FIG. 1 shows the main embodiment of the invention. The invention centers on the "bar and slot", (this to be discussed in FIG. 3). The main embodiment pictured here in FIG. 1 is only one use of the bar and slot. Other ramifications will be discussed later in this application for invention. This embodiment I will call the "Handy Table" as it is shown.

I start my description with the work surface shown as the top. The work surface is in three sections, a left section, a right section, and the center section. The left section and the right section are exact and interchangable from side to side. They are identical for ease of use and for manufacturing purposes. The center section can rotate 360 degrees and has the ability to lock in 5 degree increments, and if neccessary, depending on the project being worked on, can lock at any degree.

Around the perimeter of the center section and the edge of the left and right sections are entrance holes in the shape of a cross (+). These I call slots. These slots work with the insersion of a bar. The bar allows clamp units to work with the surface holes that also house clamp units. The specifics of these will become clearer as we progress to other Figures.

The top of the work surface has 77 holes for clamp units and the edge of the center section and the left and right sections has 44 slots. The combinations of the slots and holes enables well over 100 possibilities in clamping variations.

One more feature of the work surface is on the edge just left of the center slot. This is the "view window". Through this window the user can see to adjust the center section to any degree the user wants. Adjustment is made in two ways, by means of a random lock, located to the immediate right of the center slot which allows specific degree locking, or by a lever located on the work surface frame, which allows 5 degree locking intervals.

As we look at the FIG. 1, just below the work surface is the work surface frame. Along the front of the frame are three levers and a handle. The lever to the far right of the center slot is the means of locking the center section in 5 degree increments. The next lever on the right side closest to the center does the same job as the left side lever. They enable the left or right side to be extended for additional clamping ability or to be removed completely. This enables the center section to be used with one side or the other or without either and allows use of the center section slots. (More detail on these in other Figures.) The handle, "tilt lock plunger handle" is the one to the immediate left of the center slot on the work surface frame. This allows the work surface to be tilted to the front, a full 90 degrees or anywhere in between, from its normal operating position.

Next, below the work surface frame is the panel that connects the upper leg sleeves. Above the upper leg sleeves are angle iron cross members, (not shown here, but in other Figures). In the middle, protruding through the panel is the curved rack gear. When tilting is desired, a tilt crank handle, located on either side of the upper leg sleeve, cranks a pinion gear, which pulls the work surface down in front.

There are height adjustment levers located at the bottom and outside of the upper leg sleeves. These allow the surface to be adjusted in ½ inch increments. The right leg shows these holes. The leg is fixed in the lower leg sleeve by screws or may be welded. The horizonal cross member is welded to the lower leg sleeve and is hollow. This allows the front "arm" to be entended out and locked in place when in use, or for retraction when not in use. This arm is/can be made of extruded aluminum for strength and lighter weight. In the front and back of this horizonal member are floor glides for leveling and stability on an uneven surface, and casters. These casters adjust a full 2½ inches to allow for portability and transport. They also lock so rolling doesn't occur when working on a project.

There is a tilt rod lock that is shown at the top of the upper leg sleeve that allows the tilted top to be locked at a specific degree. More on this in FIG. 18.

Figure 2:
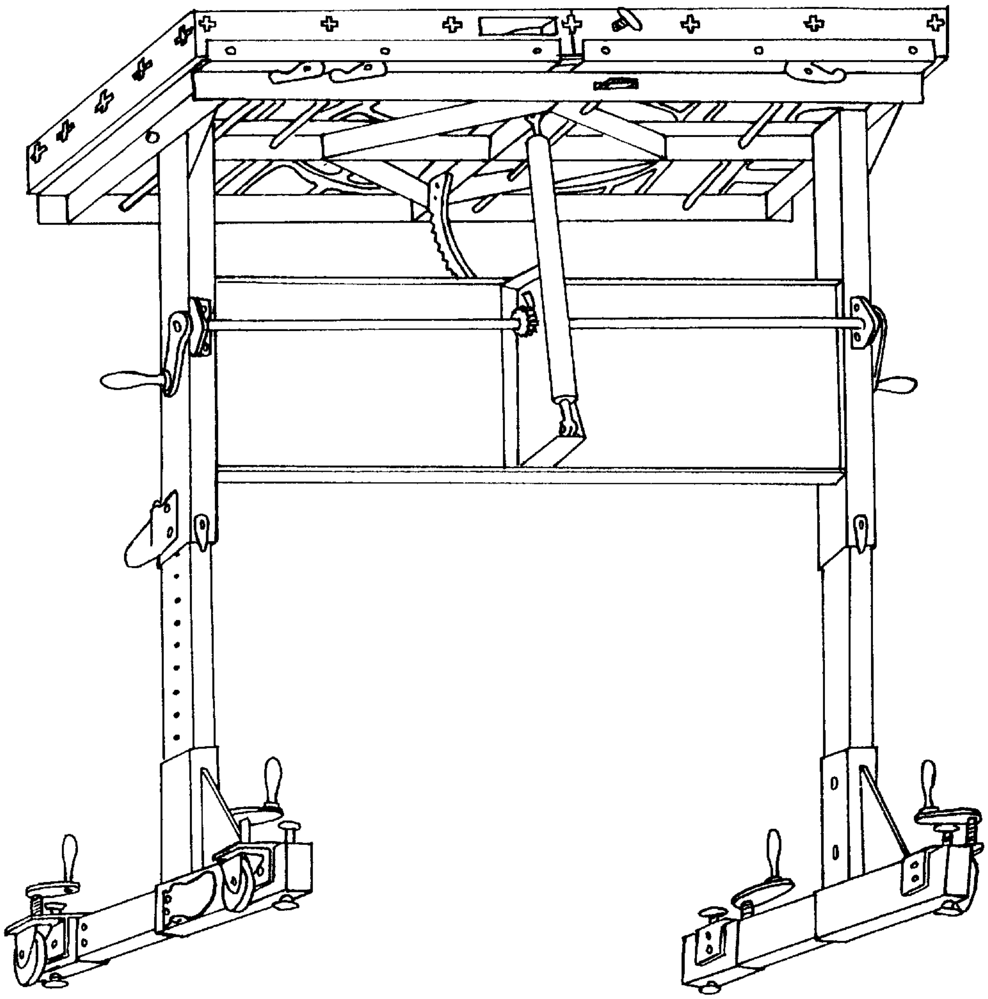

FIG. 2 shows the back of the "Handy Table". This view allows the under side of the work surface to be seen as well as the structure of the work surface frame and the pinion gear. Also the "gas spring" and the right angle bracket to the panel. you can also see the slots along the back edge of the work surface, the levers on the back side of the work surface frame, the structure of this frame, and how the gas spring attaches. The curved rack gear is also shown attached to the work surface frame, protruding through the panel, and meshed with the pinion gear. Here, on the back side of the upper leg sleeve, is shown how the tilt crank handles,(one on each side), are attached to the crank rod. These are supported by the crank rod brackets. The crank rod runs all the way across the back and is supported close to the middle by a right angle support bracket that also serves as a mount for the pinion gear, and for the lower gas spring rod. The height adjustment holes can be seen and are on the outside of the leg.

FIG. 3 Here is shown the bar and slot. This is what the invention is based on. The "bar" is a metal bar made of cold rolled steel (#100), and will be in 3 different lengths. 6 inches, 12 inches, and 18 inches. The bar is ¼ inch thick, ¾ inch high, (wide), and has a ¼ inch hole drilled in it ⅜ inch in from one end and centered on the width of the bar. The hole will house a ¼ inch by ¾ inch roll pin (#102). This will be a press fit and the roll pin will be centered in the hole, protruding ¼ inch out from either side of the bar. FIG. 3-A shows the side and end view while 3-B shows a top view. (Bar lengths may vary.)

The next figure, 3-C shows the slot, single slot #104 that the bar is placed in. The bar slides into the slot at approximately a 10 degree angle. (At the time of manufacture, this angle will be determined precisely.) The slide fit clearance for the bar is 0.015 inch on top, bottom and sides of the bar. The roll pin clearance is 0.03 inch. The bar is slid in the slot opening and follows the 10 degree angle until it reaches the lowest point of travel 3¼ inches in from the entrance point. Light pressure is then applied to the protruding part of the bar guiding the roll pin up into the top of the slot, ending its travel. Now the bar is ready for installing any of the clamp units. This allows an object to be clamped off the surface of the table or close to the work surface, both on and off the surface at the same time, and of course, on the work surface. The system is designed to accept any shape and size, within reason, up to approximately 60 inches long and 48 inches wide, down to ¼ inch by ¼ inch. Since the table is height adjustable to a 1/32 of an inch and can be moved easily because of the casters, adding a second, third or fourth table allows larger objects, up to 30 or 40 feet, be worked on. Examples would be a large abstract picture window, or maybe a large conference table top. There will be longer length bars available as an option so that clamp units can be used as bar clamps and used seperately from the work surface.

FIG. 3-D shows the dual slot. There are two of these. One is located center-front, and one center-back. On either side of these in front and in back are two-section slots. The dual slot can be used in two ways; with the center section and the left and right sections removed, or when the 3 work surface sections are as one complete top. The two-section slots can only be used when the work surface is as one unit. (See FIGS. 5 and 6 concerning this.)

Figures 4A, 4B:
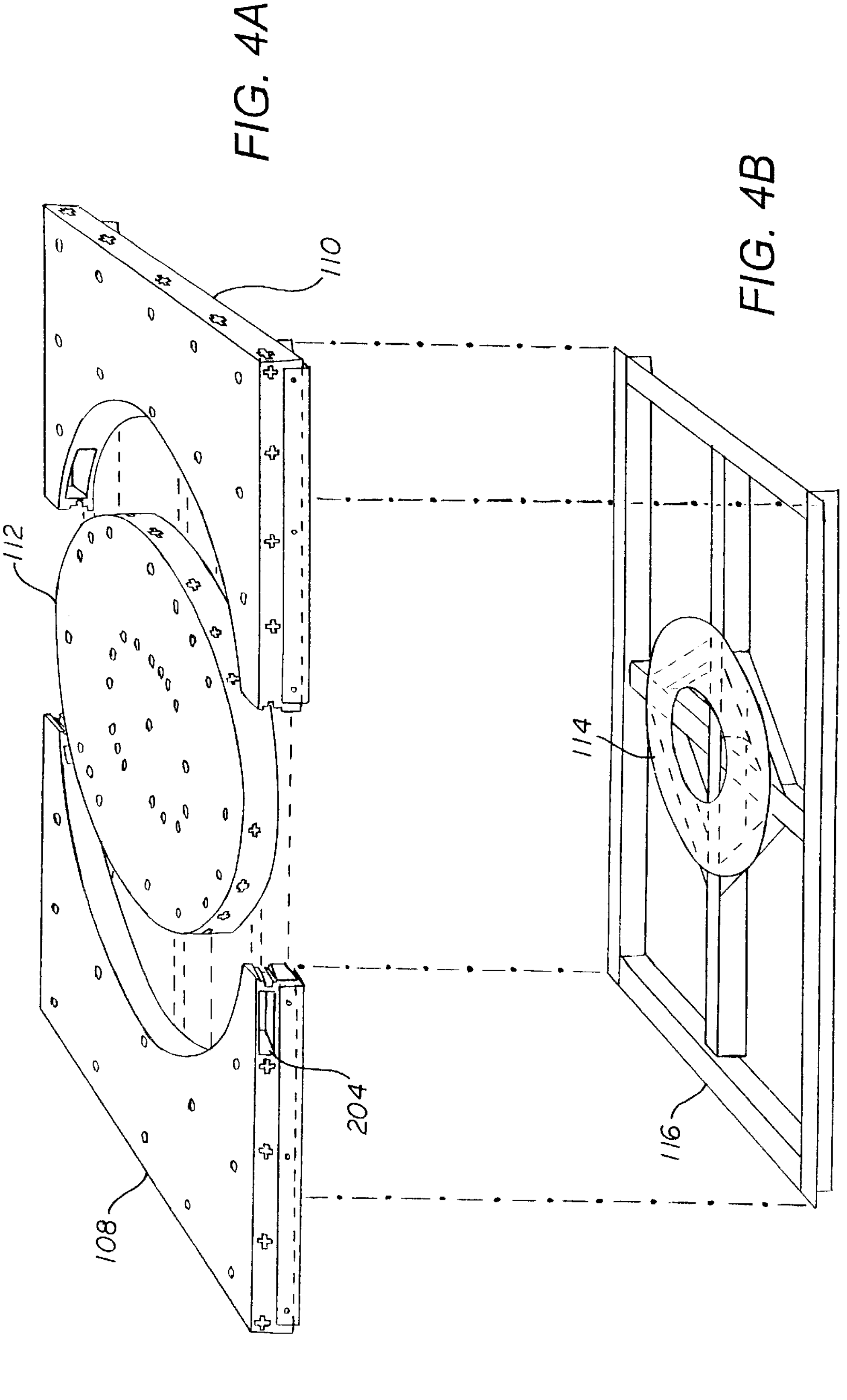

Note in this figure that there are two roll pin cavities. In 3-C there is only one. The roll pin cavity to the right is used when the work surface has all three sections in place. The cavity to the left is used when the left and right sections are removed. FIG. 4 shows the left and right sections extended, but they are easily removed for allowing use of the center section slots. The dual slots have the first 1½ inch, from entrance point, divided up between the left and right sections. The "dual" portion is in the center section. The "two-section" slots have a portion to the left and right sections and the other portions are in the center section. The "two-section" slots' other portions have only one roll pin cavity.

FIG. 4-A is a 3 dimentional view of the work surface shown with the left and right side in an extended position. Ability to extend or even remove the-left or right sections independently is one of the features of the work surface. Another feature is the ability of the center section to rotate 360 degrees and random lock at any particular degree)or lock at 5 degree increments or lock to specifically accept a 3, 4, 5, 6, or 8 sided object.

When the left and right sections are slid in towards each other, tight against the center section, they form one solid surface. When extended, this allows for a larger object to be worked on. When the left and right sections are removed, this allows bars to be used with a clamp unit in the sides/edge of the center section. This allows for an object as large as a 40 inch diameter to be worked on.

There is a turntable that attaches to the under side of the center section. It also attaches to the work surface frame, which is the next piece under the center section. This turntable is a manufactured product. The one I found suitable for the "job" was located in a McMasters Carr catalog. It is 12 inches in diameter and 5/16 inch thick and capable of supporting 1,000 pounds. The best part is that it's only a few dollars. Anyway, this ball bearing turntable is more than sufficient for my needs, and it part #114.

Now we come to 4-B, which is the work surface frame. It consists of 1¼×1¼×⅛ inch angle iron. (Hot rolled steel has sufficient strength for this application.) In FIGS. 1 and 2, towards the bottom of the front and back edge of the work surface is a "track" that screws on to the work surface. This track works in conjunction with the frame as a guide for holding the work surface frame straight and fairly snug with the left and right sections. Now back to FIG. 4B. Because space is so small I haven't tried to show the specific layout of this frame here, but in another larger figure. The work surface frame is #116.

FIG. 5 This figure shows, for visual purposes, a top view drawing of the left section as if the top were transparent so that the network is exposed. This left section is part #108. There are 3 different sizes of holes used. The first I'll discuss is item #120, holes for mounting particle board to the work surface. They are drilled completely through the left/right sections, (which are exactly the same for manufacturing reasons and interchangability.) and the top ½ inch is threaded for a ¾ inch long, ¼/20 flat head screw. The particle board is an option and when the invention goes on the market, the "Handy Table" will come with a set, (one piece for the right, one for the left, and one piece for the center sections of the work surface) of the three pieces. The particle board is for protection from damage of the work surface by use of drills, hammer, etc. Anyway, the #120 holes are for attaching the particle board.

Holes #118 are the clamp unit holes. There are 22 of these in the left or right section. These holes are also drilled completely through the surface and the bottom ¾ inch of the hole is tapped with 7/16-/16 threads. Three of these holes are drilled into a slot as shown by #130. When this hole in particular is used for a surface mount clamp unit, the slot cannot be used for a bar insertion. Item #104 is a typical example of a single slot.

Item #124 are holes drilled up from the bottom of the section and are drilled ¾ inch deep. These holes work in conjunction with the left section extension lever. This applies to the right section extension lever, #162, as well, for the right side. These are more clear in FIG. 14. Item #128 is showing "webbing" that is typical through out the network of the left, right and center sections. This is for stress and stability of the work surface. Item #126 is also a stress component but they don't join the webbing. Instead, they start adjacent to a clamp unit hole from the bottom of the hole and go upward at a 45 degree angle reaching the under side of the work surface. I call these stress braces. Also shown are portions of the two-section slots. The other half of these will be shown in the next Figure, #6, the center section.

Figure 21:
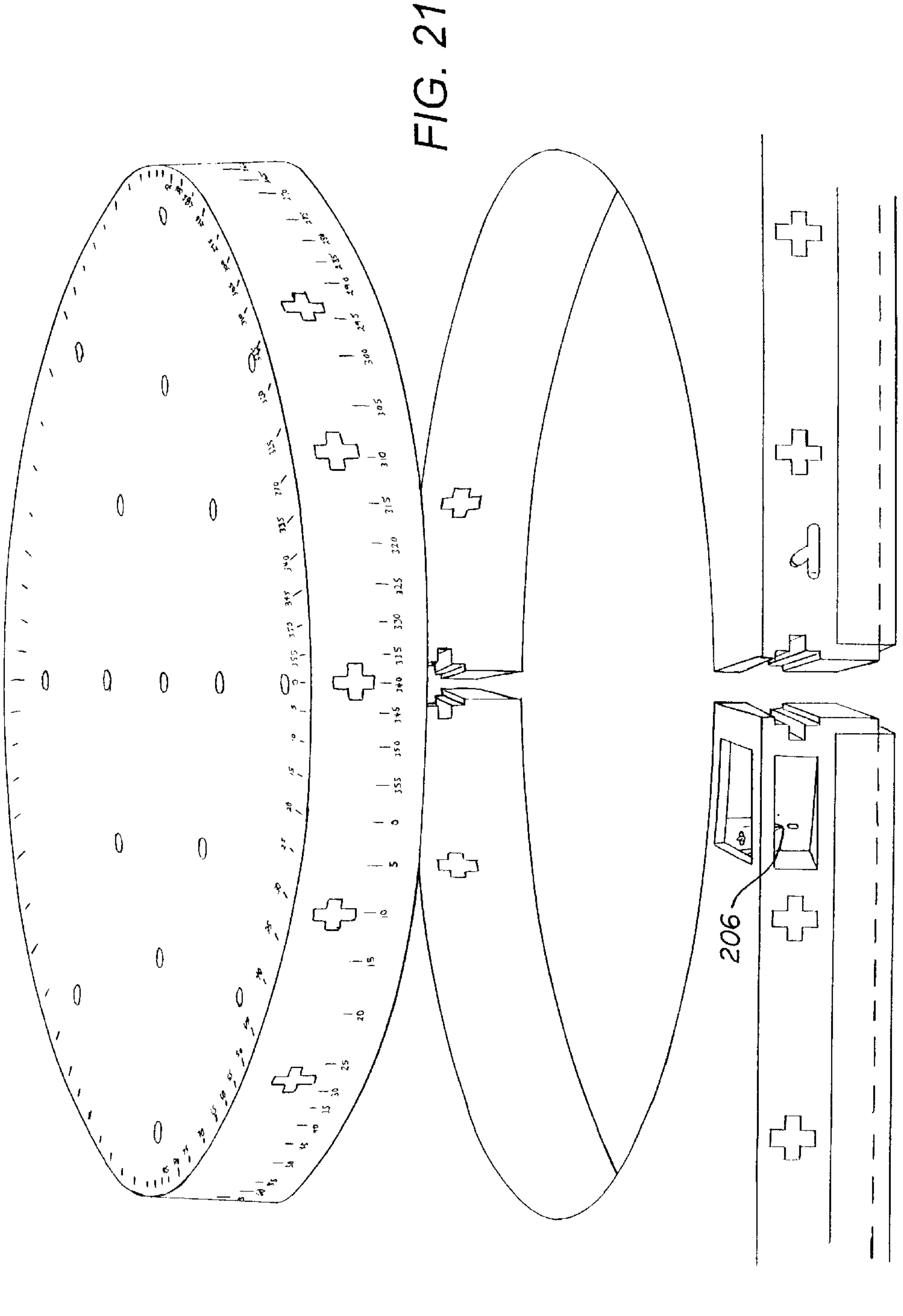

Item #122 at the back and center of this drawing shows the slot/cavity that houses the "tee" bolt with clamp head that serves as the random lock, for the center section, at any desired degree. FIG. 21 gives the details for this.

We now come to FIG. 6. This is drawn like FIG. 5 in that it is a top view looking down at this center section as if the top were transparent so that its network can be shown. I am trying to keep the drawings at a minimum as much as possible and still show all the features, parts, items, etc. Item #134; these are 5 degree increment holes around the under side perimeter of the center section. They are drilled ½ inch deep, ¼ inch in diameter. This feature is for quick use of the center section when no specific degree is neccessary. It also allows quick adjustment of the center section to specific 3, 4, 5, 6, and 8 sided objects that you can work on, or any 5 degree setting desired for the job.

The turntable mounting holes, #132, are also drilled from the bottom. They are tapped to fit a ½ inch long ¼/20 flat head screw for attaching the turntable.

Also in this figure one can see portions of the two section slots. The broken lines show the counter parts on the back of the drawing. The front is the same way as the back. Now two section slots have to be used with the right and left sections in place against the center section. When the left and right sections of the work surface are removed, the slots on the edge of the center section are accessable.

There is also shown a detail of a surface mount clamp unit hole, (#118), This 7⁄16 inch hole drilled completely through the work surface sections, has the bottom ¾ inch tapped with 7⁄16-/16 threads. The bottom ¾ inch of the clamp unit posts is threaded to match these. This allows for the clamp units to work with or without the particle board added to the top of the work surface. The threaded post of the clamp units and the threaded holes also keep the clamp units from accidently being pulled loose from the surface. This also allows for odd shaped objects to be clamped because the clamp unit can be turned in any direction. For example, a 4"×4" piece can be clamped to the table at almost any angle to be cut or routed depending on which surface holes are used to clamp the object. Something being worked on does not have to run parallel or at a right angle with the front of the work surface. It is up to the user to determine this according to their need.

FIG. 7 shows several examples of how clamp units can be used with the work surface. 7-A shows the left front of the work surface with the particle board and a track attached. This track is a guide and what allows the left or right section to be extended or removed completely. (All drawings of the work surface on this page show the track and particle board attached.) From the left side of the table there is a bar protruding. This bar has been fitted into a slot, then some clamp members have been placed on the bar. I will detail the features of the clamp units in another figure. Here, they are used to show the versatility of the invention, the main embodiment. There is a "common" clamp unit #138 that the other clamp units join with. Another unit #144 is not shown here because it is a one piece unit. I want to focus on the inner connecting units for now. Unit #142 is connected to "common" unit #138 and is on the far left, facing towards the work surface. Facing this combination is clamp unit #136, connected to "common" unit #138. (Connection will be explained in the clamp details.) Either combination is able to move along the bar and lock where desired. Clamp unit #142 has the screw that tightens to the object being clamped. It also has the ability to move the clamp face up or down. Unit #136 does not have a screw. It can, however, allow its clamp face to move up or down to a desired position and it is reversable. (FIG. B right side) It has the ability, also, to allow a bar to be locked in it so that it can become an "end" unit. FIG. 7-B (left) shows clamp unit #142 on a bar, out from a slot, moved close to the edge of the left side of the work surface. Opposite it is unit #136 mounted on the work surface, with its clamp face lowered to match the clamp face of unit #142. 7-C shows unit #142 on the work surface. Opposite it is unit #136 without "common" unit #138. A bar, with the roll pin end inserted into unit #136, locks to the end of the bar and can be moved by the "common" unit attached to unit #142. The bar lock is a part of unit #138. It is item #140. 7-D shows another two combinations. Unit #136 is shown extended out from unit #138. On the right, unit #138 is shown as simply being a "stop". 7-F is showing another set of conbinations with the clamp faces lowered. The direction all these combinations is shown from, is only a few possibilities. Objects can be clamped from front to back, or at a diagonal. Several pieces/objects can be clamped at once, on the surface or next to the surface. Because of the design of the system, one object can be clamped on one end and held firmly in place while another object can be placed at a precise distance from it and secured, and this can be adjusted to a precise measurement from the other object to 1⁄64 of an inch. I hope my explanation gives the reader some idea of the possible variations in the design. This design is very versitile.

FIG. 8

This figure is of the center section. Here you are looking down at three combinations of clamping positions. An object from ¼ inch to 40 inches can be secured and it can be almost any shape. The addition of clamp face adaptors, (an accessary), will allow for precise area or shape clamping, depending on the height of the object. (More discussion on heights will follow later on in the application.) The upper left and right clamp combinations shown are units #142 attached to units #138. On the left, a #136 unit is attached to a "common" unit, #138, and is placed in an out perimeter surface mount clamp hole. To the right of this, a combination is place in an inner perimeter clamp hole. Towards the bottom of the page, a #136 unit is locked to a bar and the bar is slid into a combination of #142 and #138 units. Building a hollow hexagon table base or a octagon window frame would be made easier by this system. Things like a 5-sided door frame or a "star" for a stage prop would be easier to assemble, also.

Figure 9C:
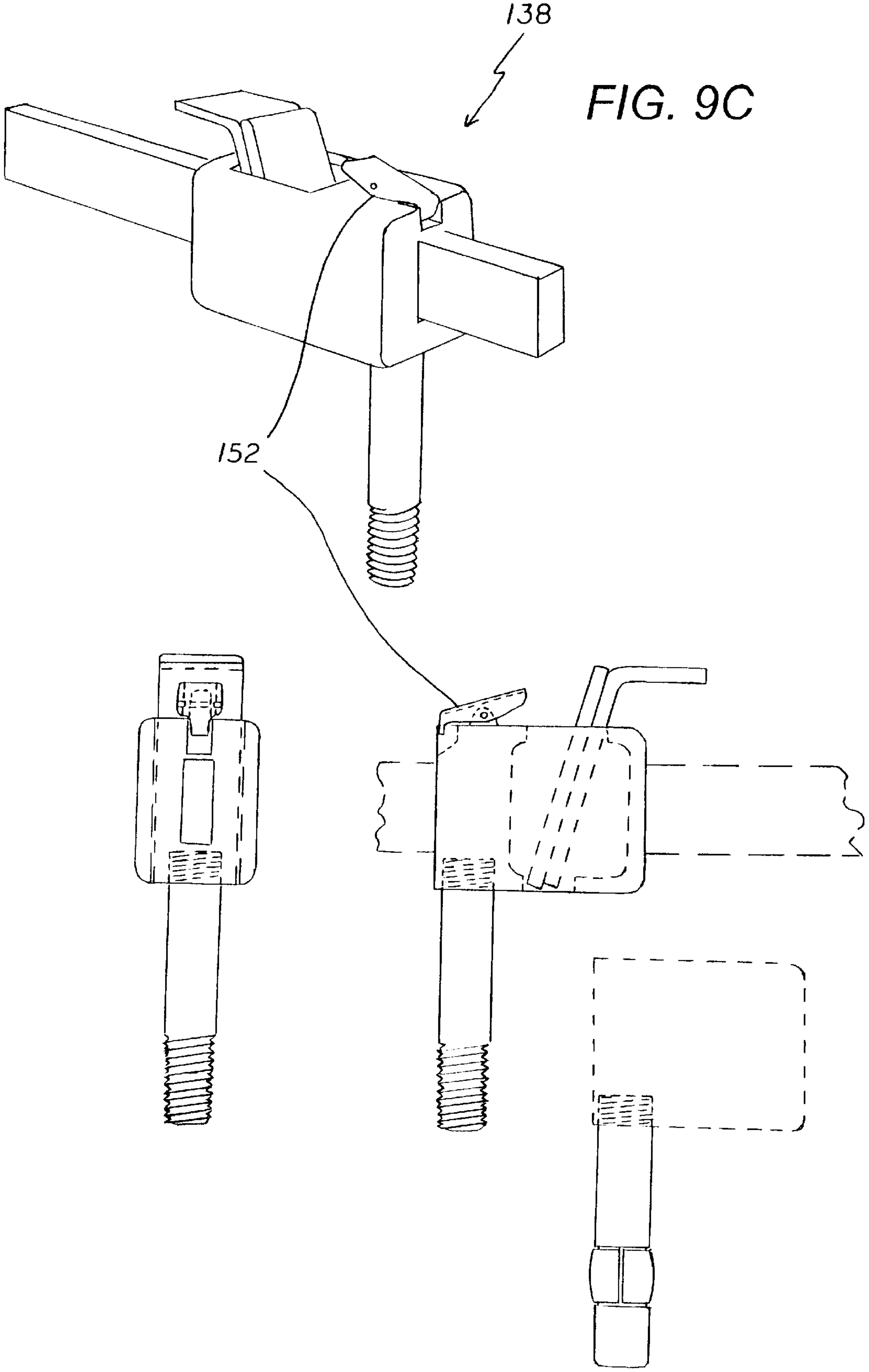

FIG. 9 is a three dimentional drawing of the main 3 clamp units, how they work together, and the specific parts. 9-A is unit #142. This piece has two vertical members protruding up from the body of the unit and is capped off and attached to the members by roll pins. This allows travel, up or down, of the screw and clamp face housing. A thumb screw secures it wherever the user desires. Screw travel is approximately 2½ inches. Because of the adjustable height clamp face, an object can be clamped down close to the surface or higher up, at the user's descretion. This also allows for matching up of clamp faces when a clamp is used on a bar and its counter part is mounted on the work surface. (See FIG. 7-B)

FIG. 9-A shows unit #142 detached from the "common" unit #138. In normal operation, these two units would be "coupled" together. The slide lock of unit #142, (as with other units that have this), allows a bar, at the roll pin end, to be locked into this unit. This will allow the common unit #138 to control the slide of the #142 unit. (See FIG. 7-D, left side.)

FIG. 9-B is a 3-D drawing of clamp unit #136. Detached from it is another "common" unit. The adjustable height clamp face, different from that of unit #142, shows it can slide up or down the vertical section of this unit. It can also be removed and placed on the back side of this unit. This allows it, #136, to be used as shown in FIG. 7-C. This unit also has its own slide lock for attaching it to the roll pin end of a bar. The thumb screw tightens the clamp face where desired.

FIG. 9-C I refer to this unit as the "common" unit because it can be used with two other units to form different combinations. It also allows other units to be clamped to a bar or mounted to the work surface. IT is unit #138. This unit has a "coupler" mounted on top, in front of the bar lock mechanism. This "coupler" is what holds this unit to units #136 and #142. (FIG. 11 will show this more clearly if not clear at this time.) For now, I will discuss the bar lock. It is a common design that I altered in order to be able to place this unit flush with the work surface. (On common pipe or bar clamps, the bar or pipe lock usually hangs below its housing. This would not work with my design.) The top view is 3-D. The front view shows the bar cavity, the coupler above it, and the bar lock behind it, and the post, which is threaded at the bottom. The side view shows the bar lock cavity. It also shows how the coupler works. The post and its hole counterpart may be threaded or compression sleeve fit. (see FIGS. 6 and 9-C)

Figure 10:
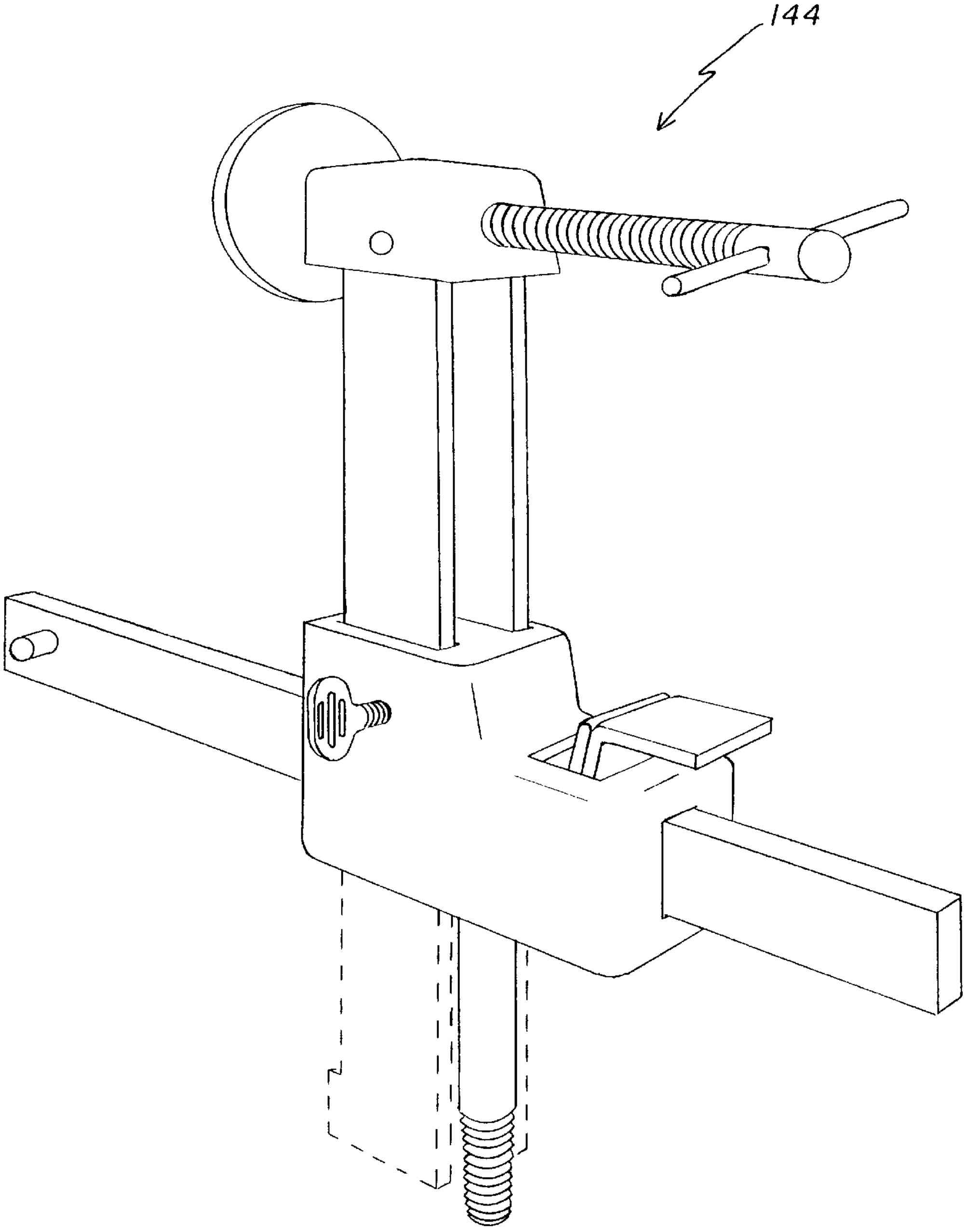

FIG. 10 This figure is different from clamp units #142 and unit #136 because it doesn't need the "common" unit to operate. Its all in one piece. This is unit #144. From this 3-D view you can see the thumb screw that allows the vertical members to slide up and down. The screw and clamp face housing is fixed to the vertical members with a roll pin. It works pretty much as a combination of units #138 and #142 would work if they were combined. One difference also, is that lower clamping of an object on the work surface cannot be done with this clamp unit. When used on the work surface, the clamp face is about 5 inches high. This works fine where larger objects are being secured on the work surface. This is also designed for securing heavier objects. In all the clamp units, the bar takes most of the pressure and is or will be made of cold rolled steel. More on this unit in the detail of FIG. 12.

Figure 11:
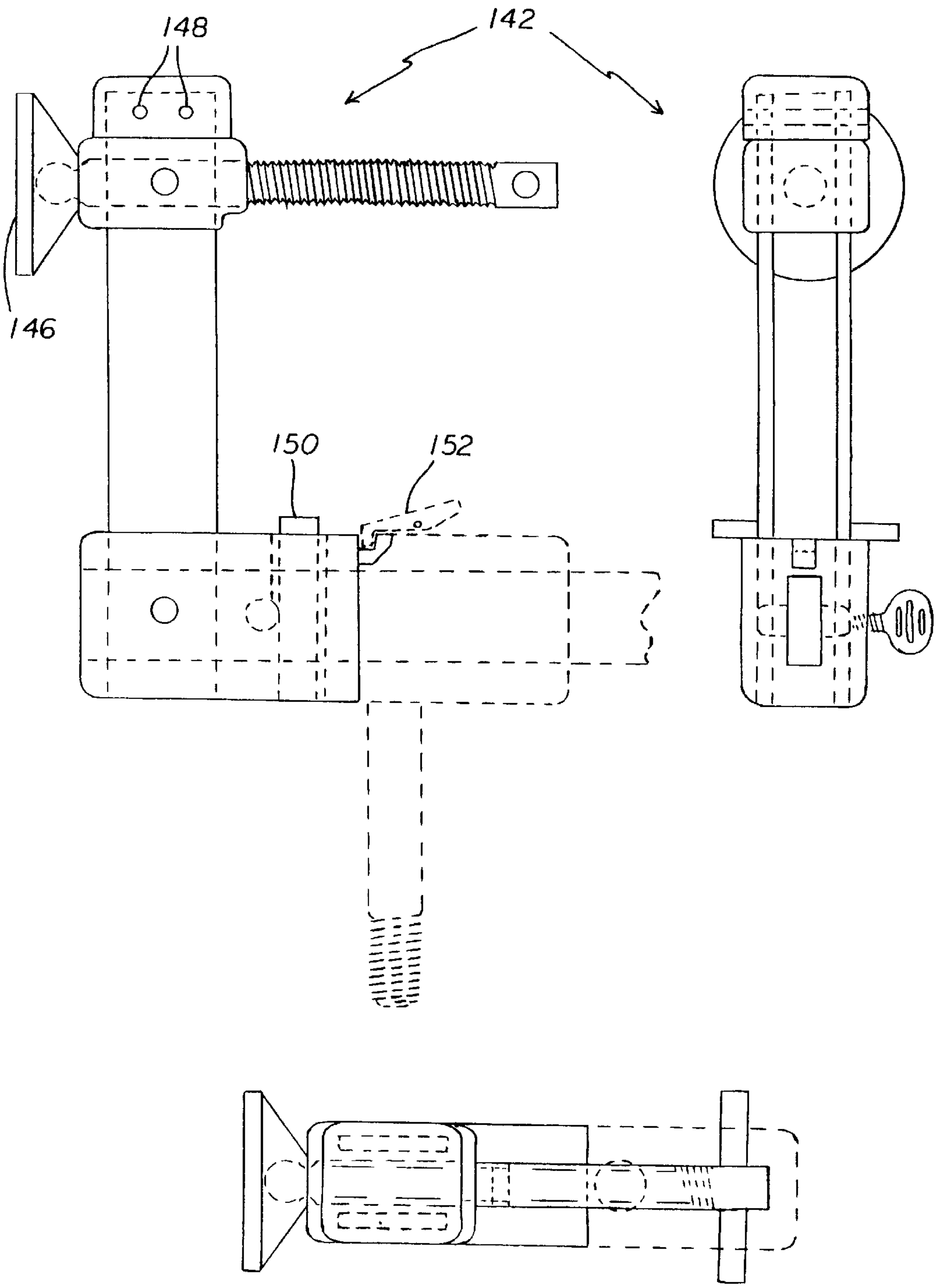

FIG. 11 This orthographic view shows item #146 which is its clamp face. Items #150 which are the thumb screw holes that tighten the screw and clamp face housing to the vertical members and the unit housing to the vertical members should a user desire to alter the unit in this way. Later in an accessories section I will show how a toggle clamp can be used with this unit #142.

The side view shows how the unit couples to the "common" unit. The close fit of the bar in the units allows for the use of such a small coupler because most of the stress is on the bar and on the vertical members. The point is, the unit coupler has an important job but is not under much stress to complete it. The post, directly below the unit coupler and unit housing, is threaded on the bottom ¾ inch. The holes that this post goes in are the work surface clamp unit holes. They are threaded the last ¾ inch. This allows the posts to mate with them, whether or not the work surface has the ½ inch particle board attached to it. Again, the ½ inch particle board for the work surface is an option for the user to protect the work surface. Once this particle board surface is worn out initially, a replacement will be offered as an accessary, or the user can make their own should they decide to do so. However, the drilling of the clamp unit holes to match the work surface is critical. Since the user will have the option as to what type of protective surface covering they prefer, they have the option to make their own. In discussing this invention with a few trusted others, their opinions were taken into consideration when these decisions were made.

Figure 12:
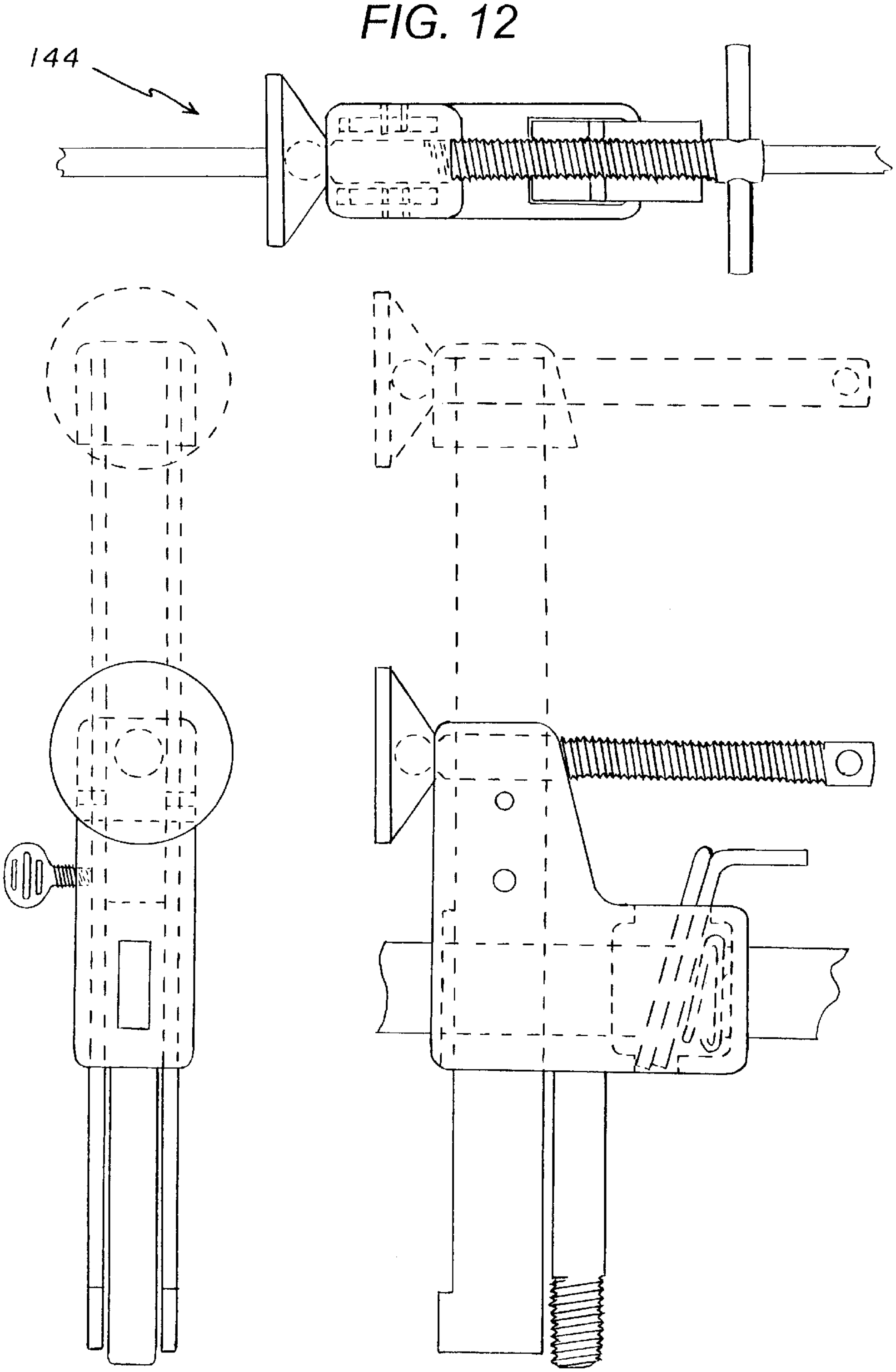

FIG. 12 This orthographic view is of unit #144, the unit with the one piece housing. Again, it doesn't need the unit #138 because of this design. In the top view, the broken lines show the positioning of the vertical members and how the screw clears them. It also shows the clamp face with the ball and socket type of fit. Also shown is the bar lock underneath the screw. The bar is shown running through the unit body. The front view shows the thumb screw that tightens the vertical members into the desired position. The "travel" of the clamp face is approximately 3 inches. This is shown in broken lines. The side view shows the one piece body and the bar lock cavity that allows its movement. Also shown is the roll pin that holds the screw housing to the vertical members, and the thumb screw hole. The "lip" on the bottom of vertical members is shown. This stops, up inside the body at a specific position to keep the vertical members from being pulled out accidentally. At the end of the screw is a 2 inch by 3⁄16 inch bar, applied for tightening of the clamp face.

Figure 13:
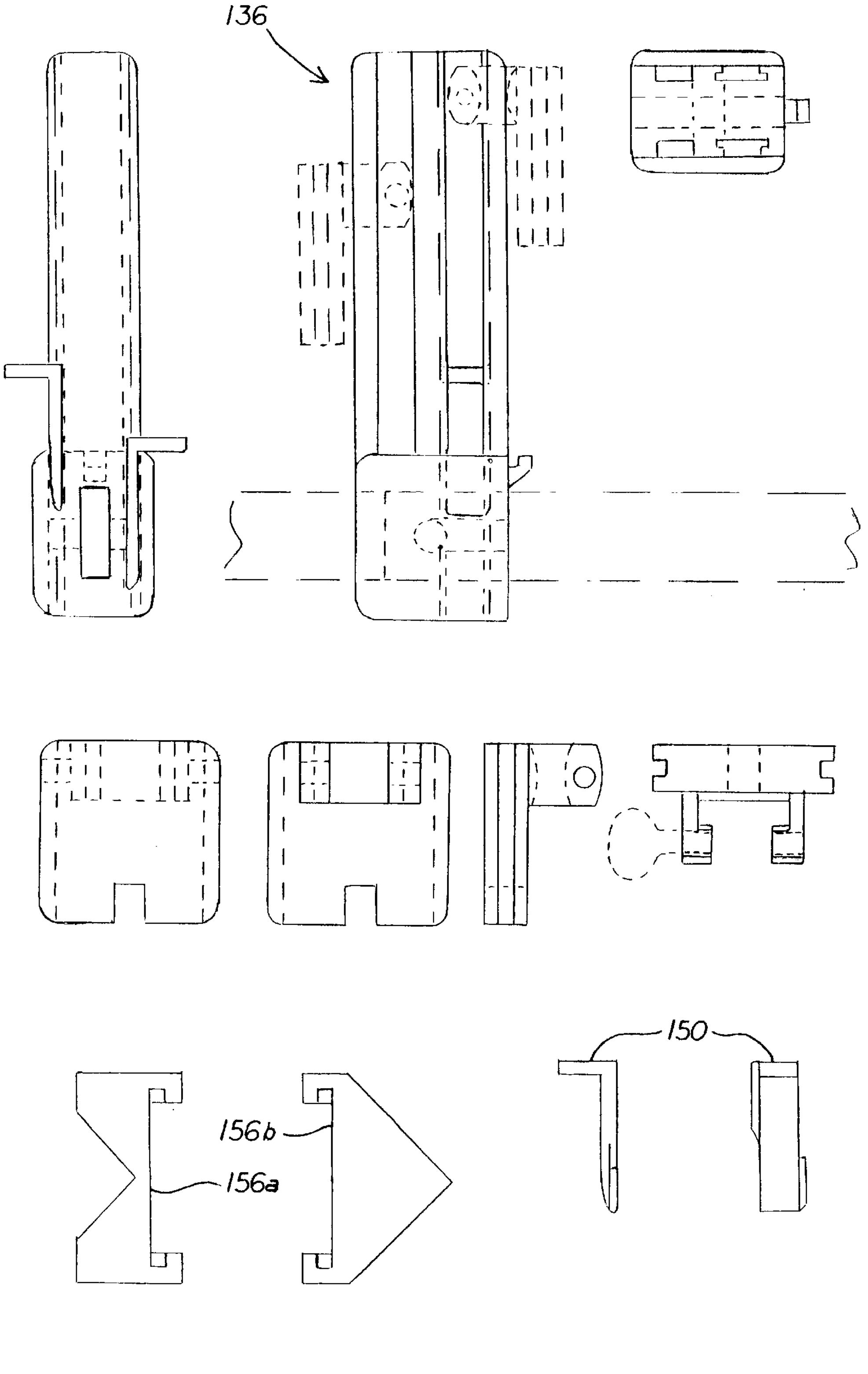

FIG. 13 This shows orthographic views of unit #136; how it can lock to a bar by means of the slide locks, and how the clamp face is reversable on the unit. The unit, with bar attached, can be attached to the "common" unit, or the bar, with unit #136, can be used as shown in FIG. 7-B and C. Four different views of the clamp face for this unit are shown. Two accessaries which will be offered in a pair, are the "inside" and "outside" corner adaptors which fit on the clamp face. These are items #156, A and B. A detail of the slide lock is shown as item #150 in an edge and side view. Oh, the top view of this unit shows the unit coupler "catch". This is also shown in the side view. This is what the unit coupler of unit #138 "catches" to, to join unit #136 to unit #138,. or unit #142 to unit #138, (common unit). The arrows in the front view are to show that the slide locks can be engaged independantly.

In having described the work surface of the main embodiment and the clamping units and how they work as best as I could, I now will explain the operation of the work surface frame and the levers that enable the work surface system to accomplish what it does.

Figure 14:
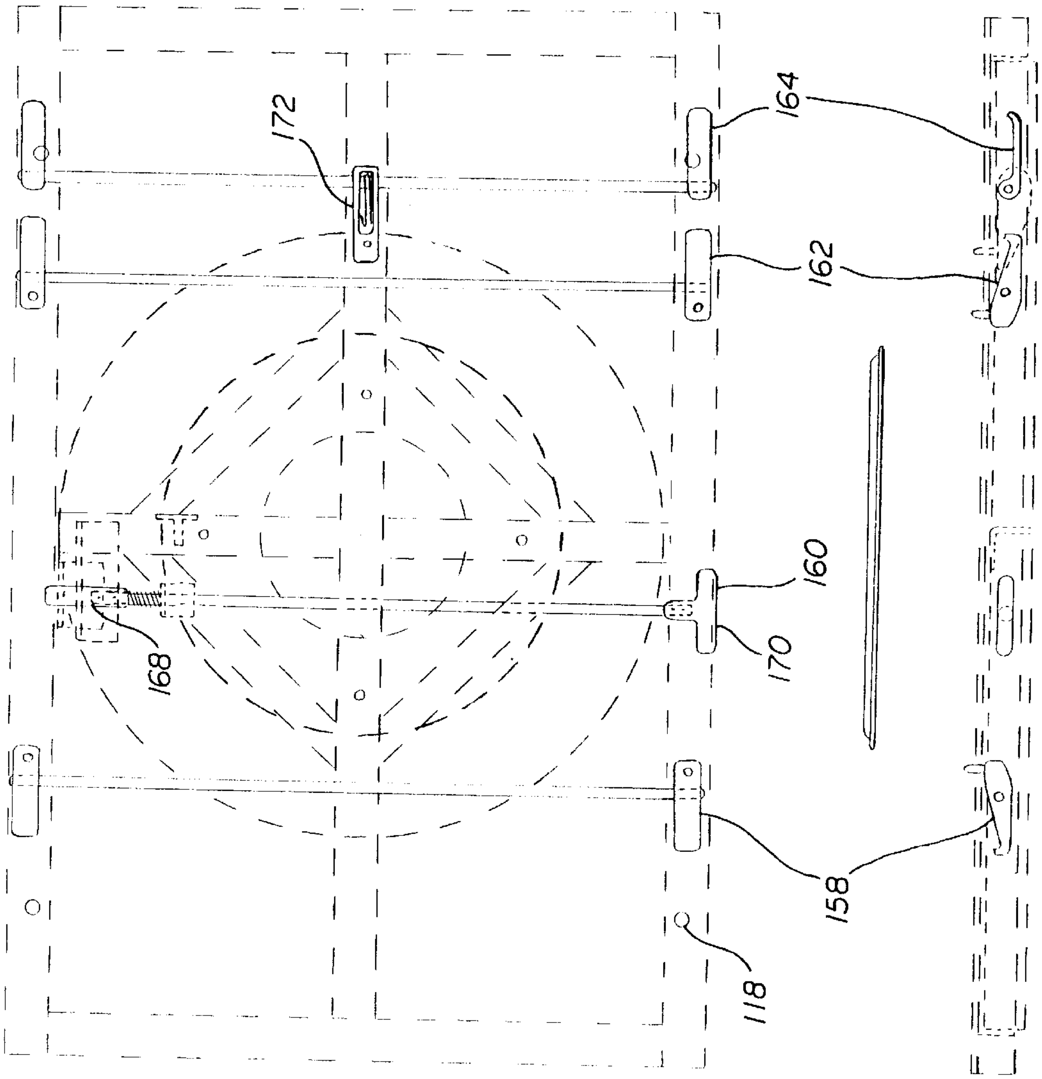

I start with FIG. 14. The outside rectangular broken lines are the outline of the work surface frame. The broken lines that criss cross and that are at a 45 degree angle to these represent the inner structure of the work surface frame. This inner structure is set 5⁄16 of an inch below the perimeter rectangle and is to be welded to the rectangle. All of the frame members are 1¼ inch by 1¼ inch by ⅛ of an inch thick angle iron, (hot rolled steel). The reason the inner structure is 5⁄16 of an inch lower than the perimeter is because the turn table for the center section is 5⁄16 of an inch thick. This makes the left and right sections of the work surface the same height as the center section. The center section "rides"

on the turntable alone, and the left and right sections of the work surface "ride/rest" on the rectangular part of the work surface frame. The frame members of the inner structure at a 45 degree angle are for stress and weight support. The broken line circle, the outer one, represents the size of the center section. The middle and inner broken line circles are the outer and inner size, respectively, of the turn-table. The holes in the "cross" part of the inner structure are for mounting of the turn table. This upper drawing is designed to show the placement of the levers and their relationship to the work surface frame. It is also meant to show the placement of the turn table and the center section, As if seen from the top of the work surface frame. Shown below the top view is a side view of the turn table. Below it is a side view of the work surface frame and the levers as they look from the side. The four 5⁄16 rods that connect the levers run from front to back and are fitted in holes in the vertical part of the angle iron frame. This keeps the front and back handles sturdy and the middle angle iron keeps the rod from bending because the distance is so short between the supports. (Between the angle irons) Item #158 is the left section extension lever. The same type lever and action is in the front as well as the back. This is so that extension of the left section or even removal can be accomplished if the work surface is tilted at 45 degrees or somewhere in between. This is also levered in the back so that if you are working from the back, you don't need to go around the the front to operate this feature. The same goes for item #162 which is the right section extension lever. Lever #160, the lever slightly Left of the center of the frame is a lever you pull out away from the frame to release the tilt lock plunger, (on the opposite end), which allows the tilt operation of the work surface. The "tee" handle makes this quick and easy. Lever #164 is the means by which the center section can be used in 5 degree increments, a full 360 degree rotation. This is for a quick movement of turning the center section to a desired degree I.E. 5 degrees, 10 degrees, 15 degrees, and so on. The bottom of the center section also has specific holes drilled around the circumference, (like the five degree holes), for 3, 4, 5, 6, and 8 sided objects. Lever #164 also handles this operation. Item #166 points to one of the 5⁄16 inch rods. Item #168 is the tilt lock plunger that protrudes through the upper frame work of the table/invention and into the work surface frame, (see FIG. 15). Item #170 is the tilt lock plunger handle. Item #172 is the pivot arm of the 5 degree increment locking pin for the center section. Also shown are brackets that the plunger "guides" through, and the upper gas spring spindle for mounting the gas spring to the work surface frame. Also shown is where the curved rack gear attaches. Some of the means of attaching parts to this work surface frame will be seen in other figures. Because of the limited paper size, I couldn't draw an exploded view large enough to show it all on one sheet, so I put details on other figures.

Figure 15:
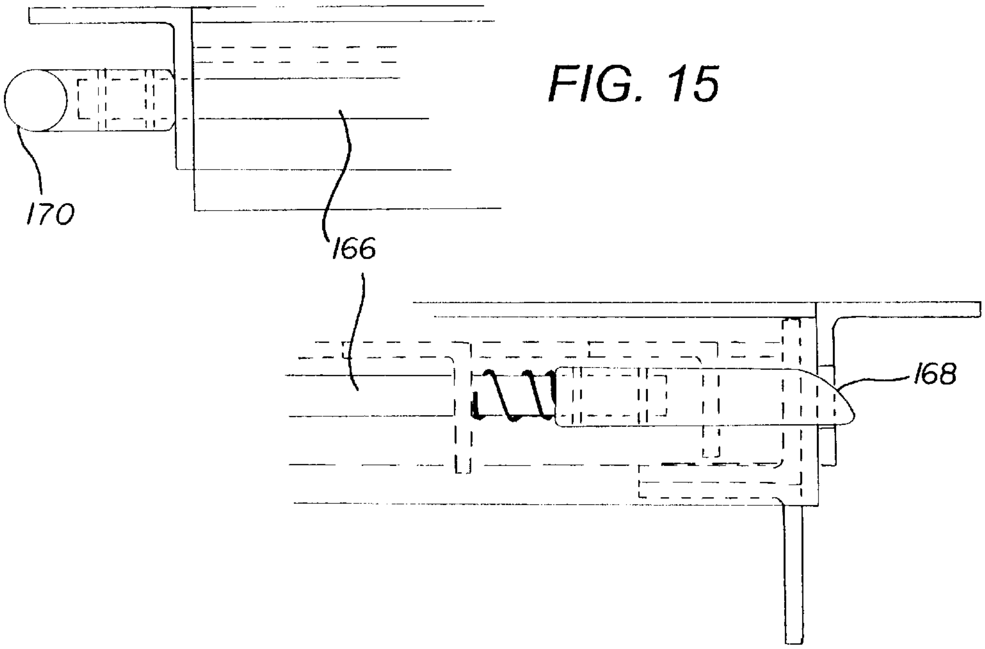

FIG. 15 There are two sectional views of the tilt lock plunger handle from the side, and the tilt lock plunger. The handle is simply for release of the work surface frame so that the work surface can begin tilting to the desired angle. This "tee" handle is located in front of the work surface frame, just to the left of center. These are items 168 and 170 respectively.

The tilt lock plunger, located directly at the opposite end of the handle, connected to the handle by a 5⁄16 rod approximately 18 inches long. The plunger is 2⅜ inches long, 7⁄16 inch in diameter, and is tapered like the "backset" of a door lock set. Just as the backset of a closing door allows the door to catch and close, this spring loaded plunger acts in the same way. The spring travel is needed to be only ⅝ inch. The rod side of the plunger is hollow, ⅞ of an inch deep so the rod can fit in. The rod is held in place by two 1⁄16 by 7⁄16 pins. The spring, inserted between the plunger and the 1×1×⅛ inch bracket/guide will be approximately 10 pounds pull force.

Figure 16:
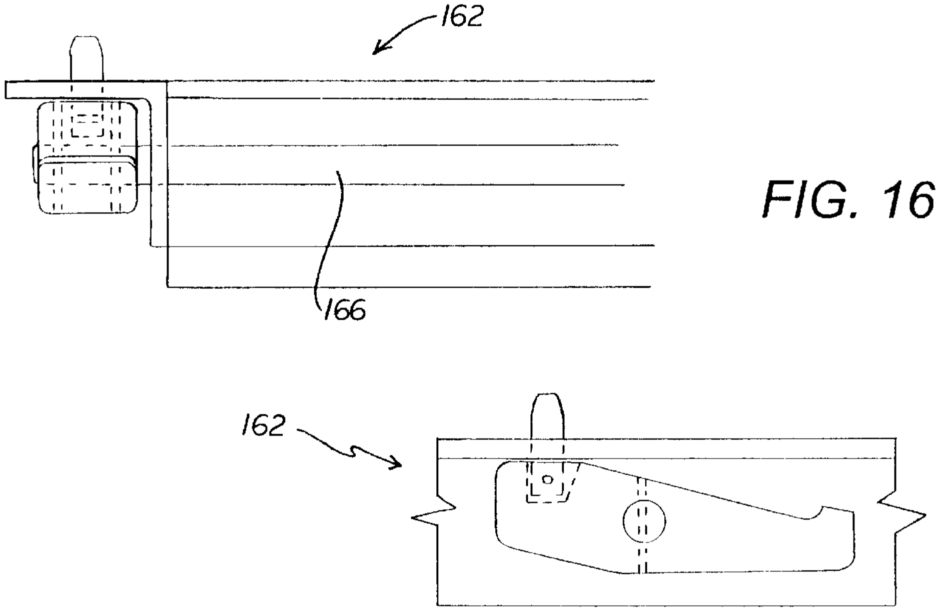

FIG. 16 This is a sectional view of an example of items #158 and #162 shown in FIG. 14. These are the right/left section extension levers. The first illustration shows an end view, look-down the front of the work surface frame from the front-right side. The second illustration show the lever from the front of the work surface frame, shown as item #162 is shown, (FIG. 14) When the lever is pushed up on the right side,(the lever looks like a whale and the "tail" of the whale is pushed up), this action brings down the tapered post, releasing the left or right section to be extended or removed. The bottom of the post is held in by a 1⁄16 by ¾ inch roll pin. The cavity of the post is tapered out at one end or side if you will, so that when the movement happens, the post is kept vertical. All four of these levers, the front and back left, and the front and back right, all operate the same way in thier respective positions. Also, all four levers are spring loaded with a torsion spring.

Figure 17:
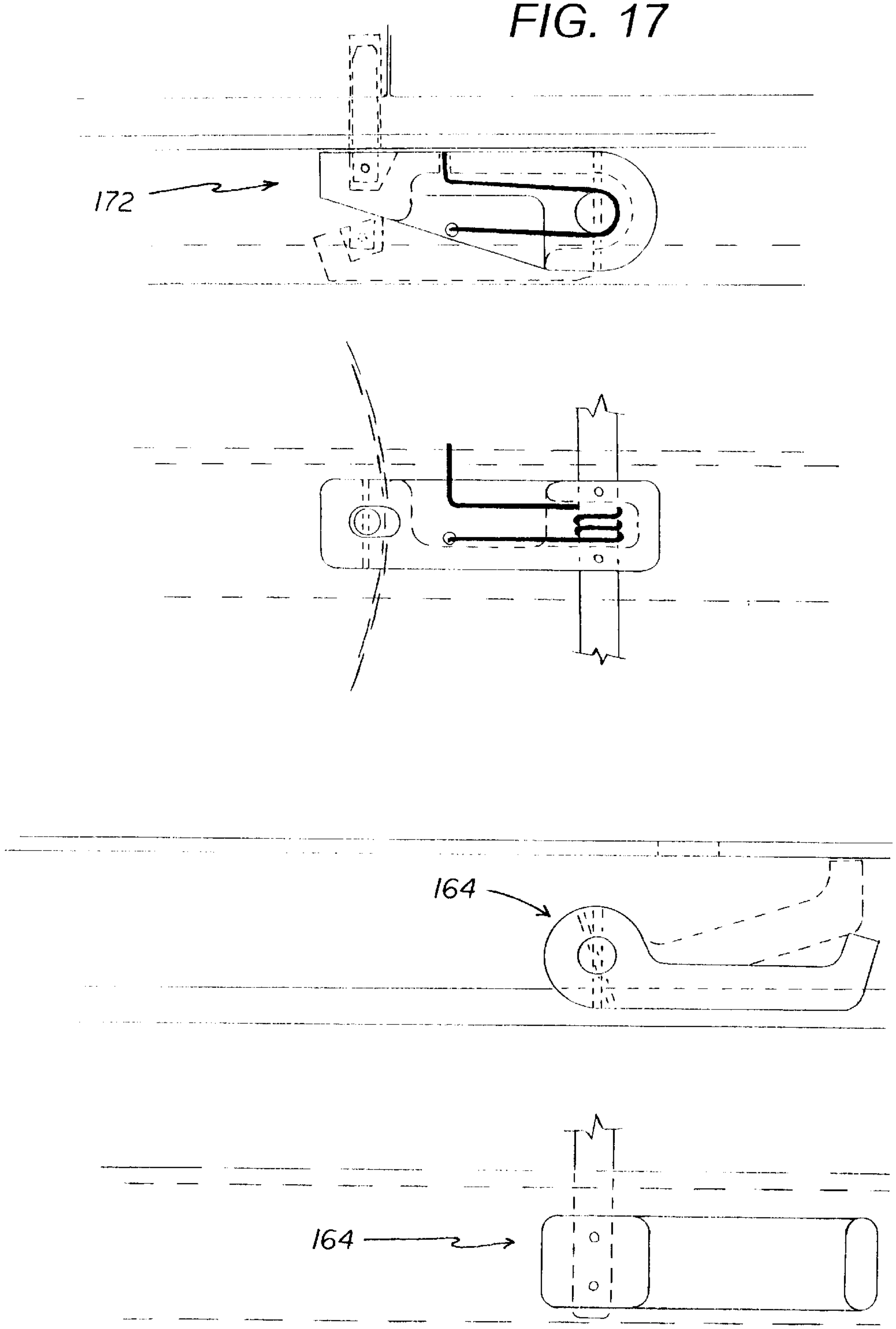

FIG. 17 The top illustration of this figure is showing item #172, which is the pivot arm controlled by lever #164. Lever #142 is used to release the post of the pivot arm. This post locks the center section where the user desires and is designed to be used in 5 degree increments for a fast application of the desired degree. The center section, besides having the 5 degree holes drilled around the bottom perimeter, also has holes that allow a setting of the center section for 3, 4, 5, 6, and 8 sided objects. (Some of these holes also match the 5 degree increment holes, I.E., a six sided object being secured would use the 5 degree holes at 60 degrees, 120 degrees, 180 degrees, 240 degrees, 300 degrees, and finally 360 or 0 degrees. Holes are provided for any of the named above sided objects. The pivot arm is attached to the center of the rod that connects to item #164, the 5 degree increment locking lever. Like levers #158 and #162, this lever is on the front and back of the work surface frame so that movement of the center section, its rotation, can be achieved if the work surface is in a vertical position, (tilted forward, which can be a full 90 degrees from level, (horizonal), or anywhere in between. The holes for this operation of the center section are shown in FIG. 6. Remember, the view in FIG. 6 is as if the top were transparent. The holes for the pivot arm are actually on the bottom of the center section. Again, views done this way keep the number of Figures down. I've been concerned about having too many figures and also concerned about not being thorough enough. This top illustration shows the pivot arm looking at it from its side. The angle iron that it is under is the center-left/right direction of the inner structure angle iron, (item "E" of FIG. 14). The next illustration of the 5 degree locking pin or pivot arm, is as if you are seeing it through the angle iron,(item "E" of FIG. 14), and the center section is shown by the broken lines. Part of the 5⁄16 inch rod is shown and so are the pins that hold the pivot arm to the rod. Note the application of the spring to return the pivot arm to its original position after movement is made. It is a torsion spring, five pound resistance.

The two bottom illustrations are of item #164, the 5 degree increment lock lever. The first illustration is like an enlarged view of the way it is shown in FIG. 14. It is located on the far right front of the work surface frame. Just above this lever is a clamp unit hole opening in the angle iron. This was neccessary for clearance of a clamp unit post when used in this particular position. This is also why the particular shape of this lever. This illustration of the side view shows how the lever works.

The next illustration is of a top view of item #164. Also shown are the pins that hold it to the rod, that in turn moves the pivot arm. The only spring needed is the pivot arm spring.

FIG. 18

Now we come to the next section of the framework that the work surface frame attaches to. This illustration shows three angle irons. These are the same size as those of the work surface frame, 1¼×1¼×⅛ inches. The back one, which has the opening bracket for the tilt lock plunger, lines up with the back angle iron of the work surface frame. The plunger bracket sets just inside of the back angle iron of the work surface frame, close to center of this assembly. The two other shorter pieces of angle iron attach to this at a right angle and these attach to the upper leg sleeves which are made of 14 guage, 1×3 inch rectangular tube steel. These shorter angle irons, approximately 10 inches long, extend past the front side of the tube steel about an inch. It is here that the pivot rod is placed along with a tilt rod lock, one on each rectangular tube. Connecting the two rectangular tube legs or upper leg sleeves is a steel panel approximately 29 inches long by 10 inches high that acts as a "strong back". This frame member, towards the center, has the gear and air spring support bracket attached to it. There are also triangle supports that are attached to the upper leg sleeves. These are welded to the angle iron and the upper leg sleeve for support and to handle stress brought on the table by an object being worked on. On the lower outside of the upper leg sleeves are the height adjustment levers, item #178.

The next item I discuss is the curved rack gear, #190 (couldn't think of a better name for this part). Anyway, in the front are two holes for attaching it to the work surface frame. On the other end, it protrudes through item #180, the 14 guage panel and meshes with the pinion gear. This pinion gear and curved rack gear are lined up slightly to the right of center while the air spring, #184, lines up slightly to the left of center so that when the tilting operation works, these two mechanisms don't get in the other's operational movement. The pinion gear, item #192 attaches to a hollow spindle which attaches to the support bracket item #182. Item #182 also holds the bottom of the air spring in place by means of a spindle welded to the support bracket. Behind the upper leg sleeves and about half way down are the crank rod brackets, item #188. This, in their respective positions hold the crank rod, item #174, in place. The crank rod runs all the way through the crank rod brackets and through the hollow spindle of the pinion gear. On each end is item #176, the tilt crank handle. The top of the air spring also attaches to the work surface frame. (see FIG. 14) Item #194, the tilt rod lock is a mechanism that simply "grips" the tilt rod with just a quarter turn on the handle and holds it in the desired position.

Figure 18:
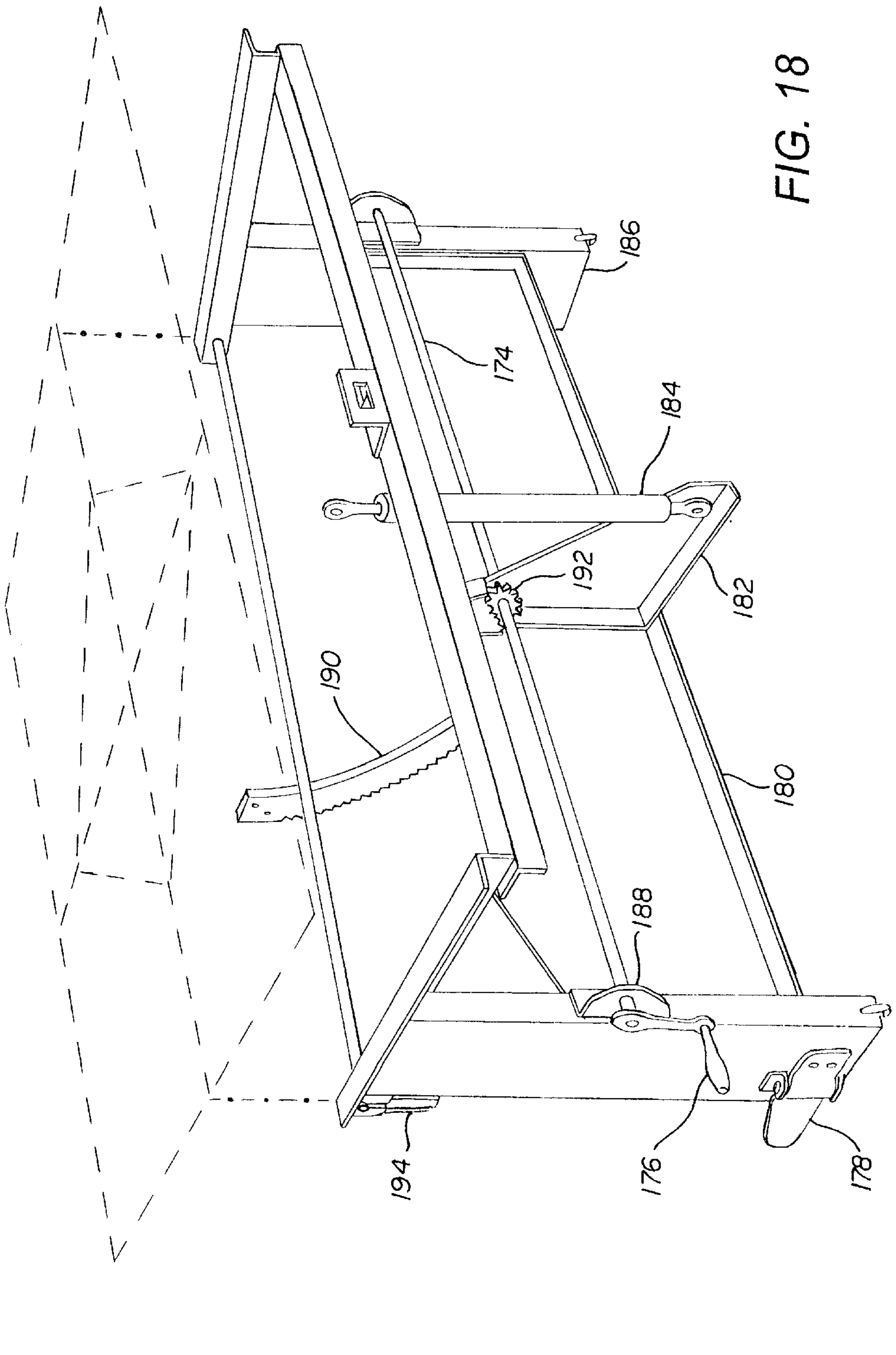
Figure 19:
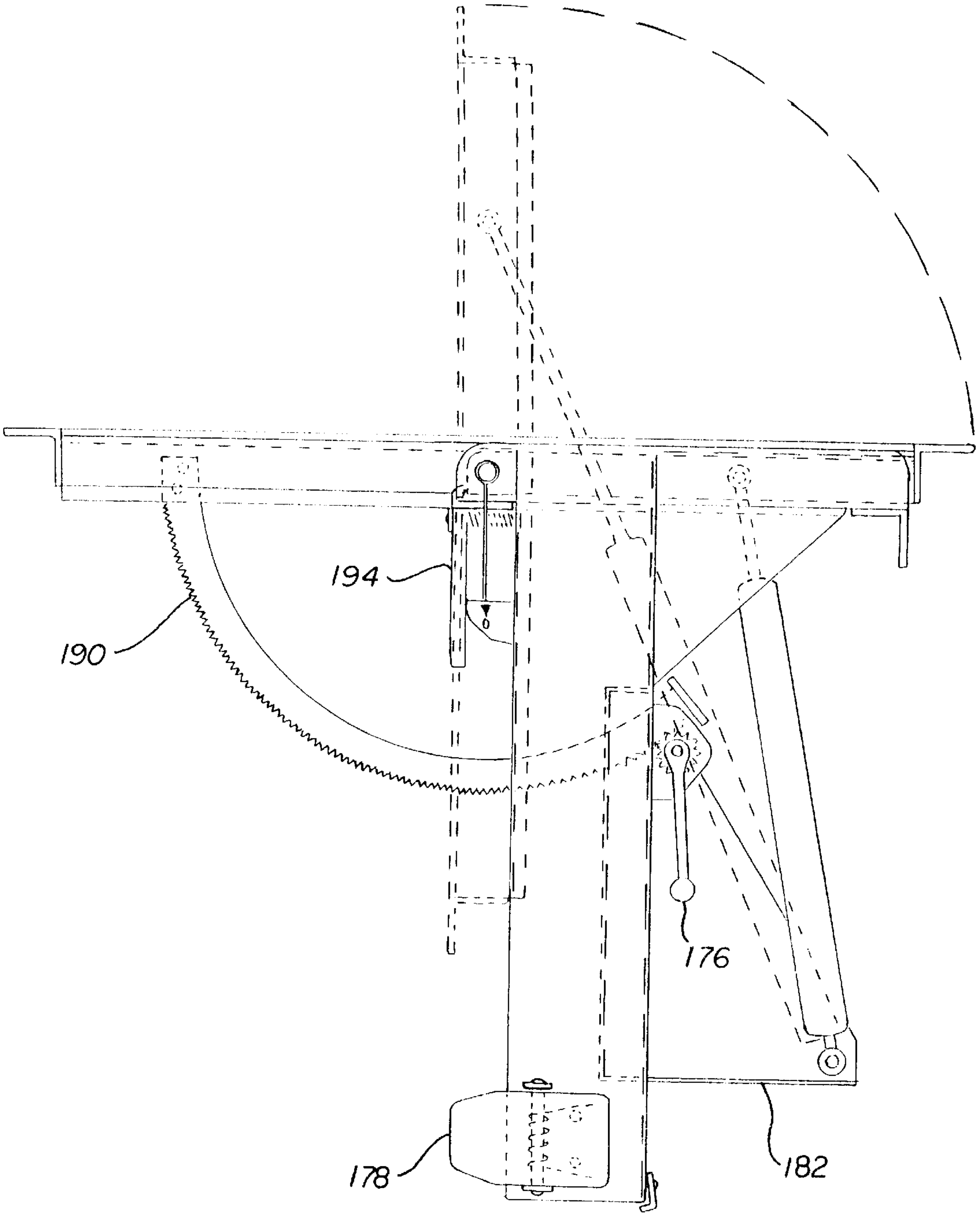

FIG. 19 This is a side view of FIG. 18, the upper frame work. The work surface frame is shown attached, and in broken lines, the work surface frame is shown in a full 90 degree tilt. The tilting is towards the front only. Also shown in broken lines is part of the support bracket for the pinion gear and the air spring lower attachment spindle. The air spring is also shown in broken lines, in an extended position. The tilt rod is shown with the tilt rod lock on it, in lock position. A simple quarter turn outward, away from the center of the table, (on either side), loosens this. The curved rack gear is shown and how it attaches to the work surface frame. The triangle brace is better shown here. There is also a guage that shows the degree of the tilt. It attaches just inside of the work surface frame to the right and left angle irons, where it will line up 0 degrees directly below the tilt rod center. Directly behind the bottom of the upper leg sleeve is a little spring clip. Its only purpose is to let the user know, by stopping the height movement, that the user is at the highest leg setting. A little hole in the back of the leg will be revealed and part of this spring clip will get caught in it, not allowing the user to raise the upper leg sleeve further. This is a safety feature. A few more will be discussed in a summary.

Figure 20:
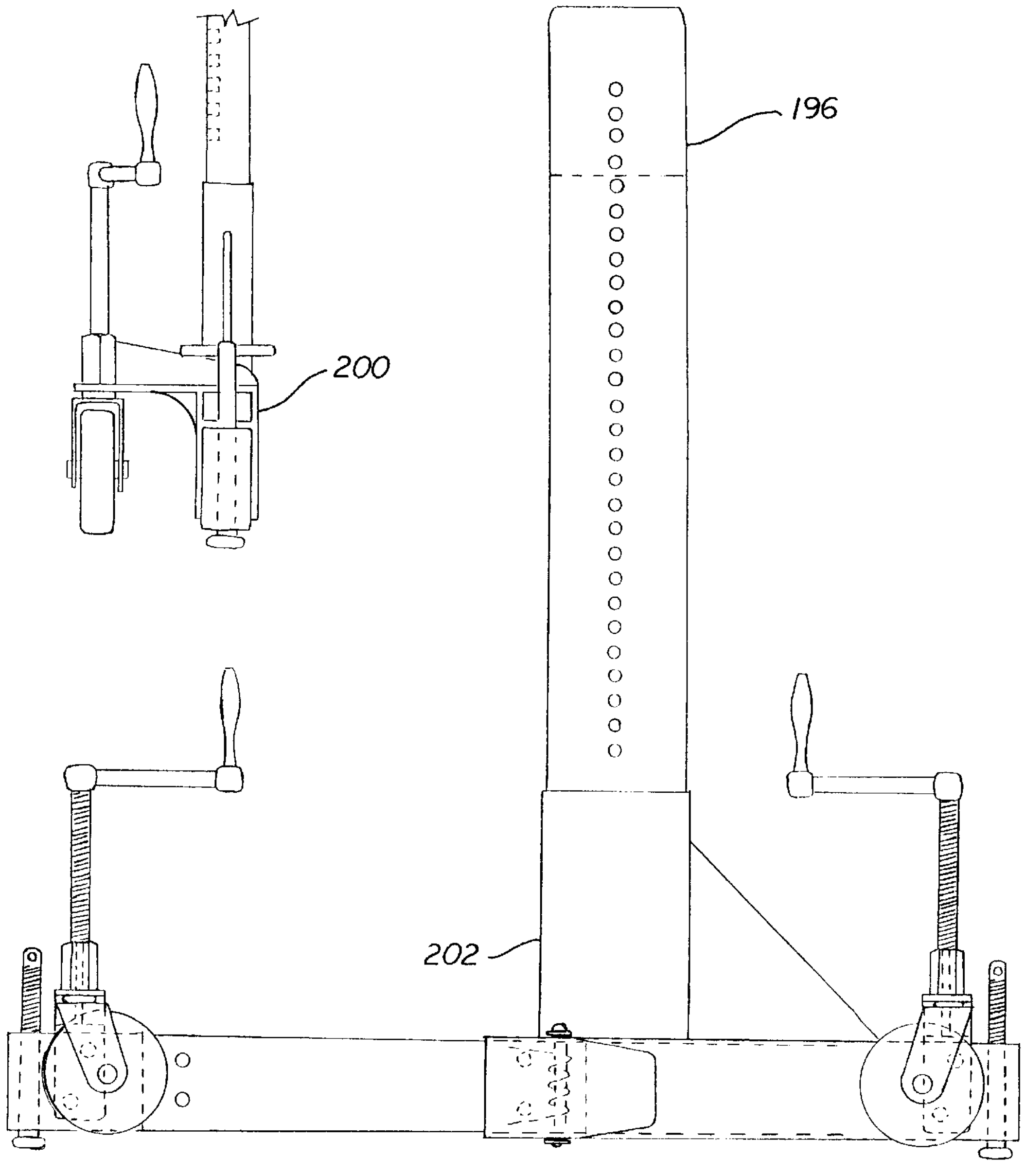

FIG. 20 This figure shows the leg assembly. There are only two legs and one is on the right side and one on the left. Both have adjustable horizonal crossmembers. Just in front of the lower leg sleeve is a lever that allows the front part of the horizonal member to move out to a length that matches the front most distance of the table surface. When slid all the way in, it will make for easy storage. Since the top tilts down, the invention becomes compact for storage. The "leg" that fits in the lower leg sleeve is to be of extruded aluminum. This is for strength and light weight. Holes are every ½ inch on the outside of the leg for height adjustment. Because of the "tee" handles that screw down the floor glides, the height adjustment can be "fine tuned" to a 1/32 of an inch if neccessary. The invention can also be leveled. I have "toyed" with the idea of including within the work surface frame a couple of leveling viles, one on either the left or right angle iron and one on the front angle iron. I'll look into this when negociating with manufacturers for the best possible price of manufacturing this invention. The casters are able to crank down fully, providing around 3 inches of clearance for movability. The casters I've had in mind are rated at 150 pounds each. I plan to keep the table weight limit around 400 pounds. Item #196 is the aluminum allow leg. Item #198 are the floor glides. Item #202 is the lower leg sleeves Item #200 is the caster bracket.

FIG. 21 This illustration shows the center section and how it would set down in between the left and right sections. Because of the size of the paper, I cannot be real precise in numbering the degrees. There is simply not enough space. However I believe there is enough data that will show the following information. To begin with, the center section will have degree markings on top as well as on the side, around the circumference. The degree markings will go in two directions on both the side and top. One set of markings for degrees going clockwise and one set going counterclockwise. One the top, "0" degrees will be at the center of the work surface. Two sets of numbers will be laid out in two different directions. On the side, the same thing will be done but "0" degrees will be laid out so that it lines up with the indicator for "0" that can be seen through the "window". This window is part of the design of the left section and part of the right section. Since the left and right sections will be manufactured as identical pieces, the left front, so to speak, will have a "window" and the right back will have a window. It will be next to the center of the table. One reason for this is so that when these left and right sections are pulled off for work to be done using the center section, replacement will be no problem because either section can be used on either side. This will also cut manufacturing costs by cutting down the number of molds that will be needed. I have purposely chosen to show only three of the slots in the back side of the left and right sections, (shown just below the center section). Either one of the slots to the right or left of the center slot is a "two-section" slot. The center slots, (front and back), is a portion of the dual slot. I have slightly seperated the left and right sections to show a 3-D picture of how this portion of the dual slot appears. Sectional views of this are in FIG.

3, Item #204 is the turntable view window. Item #206 is the degree indicator.

Figure 22:
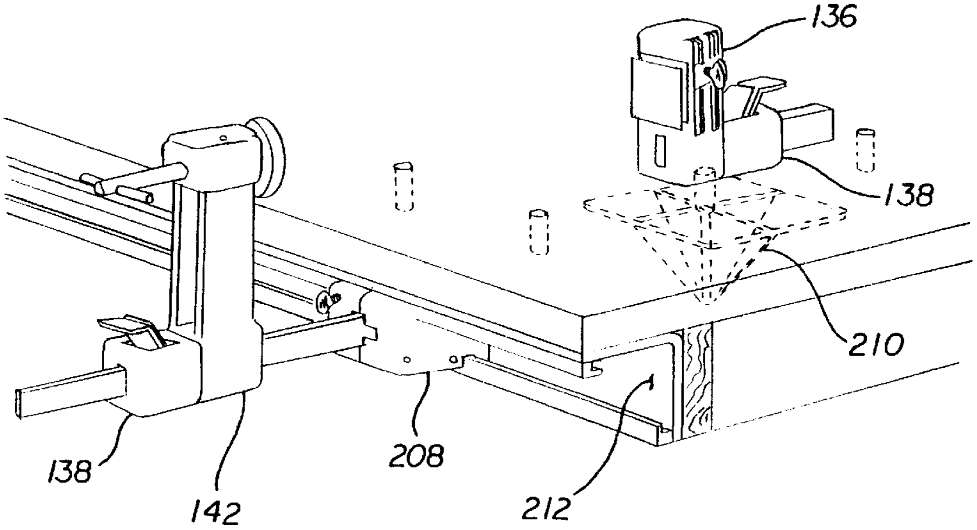
Figure 22:
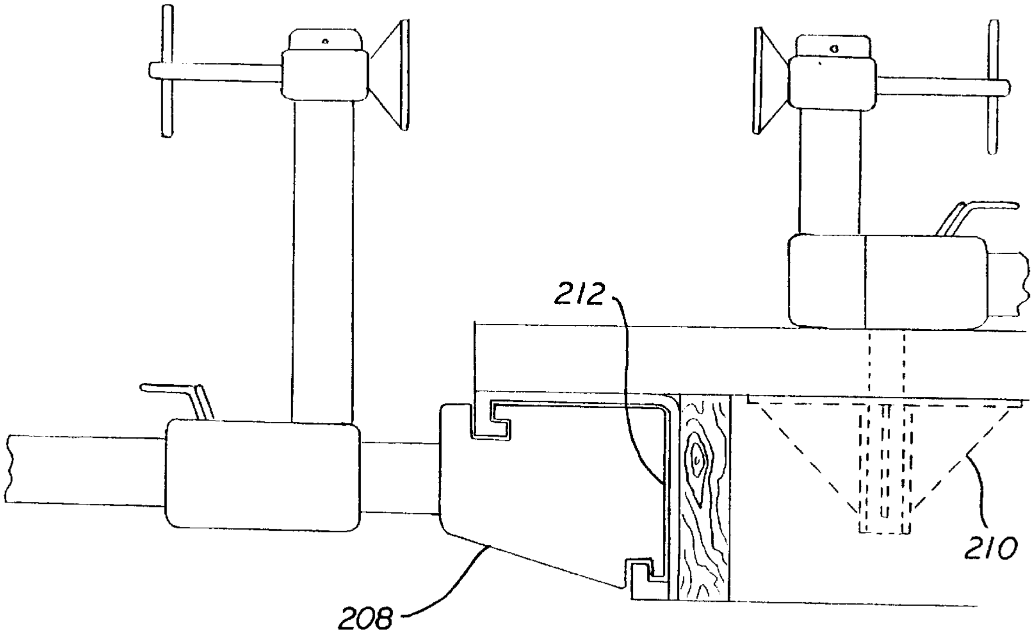
Figure 24:
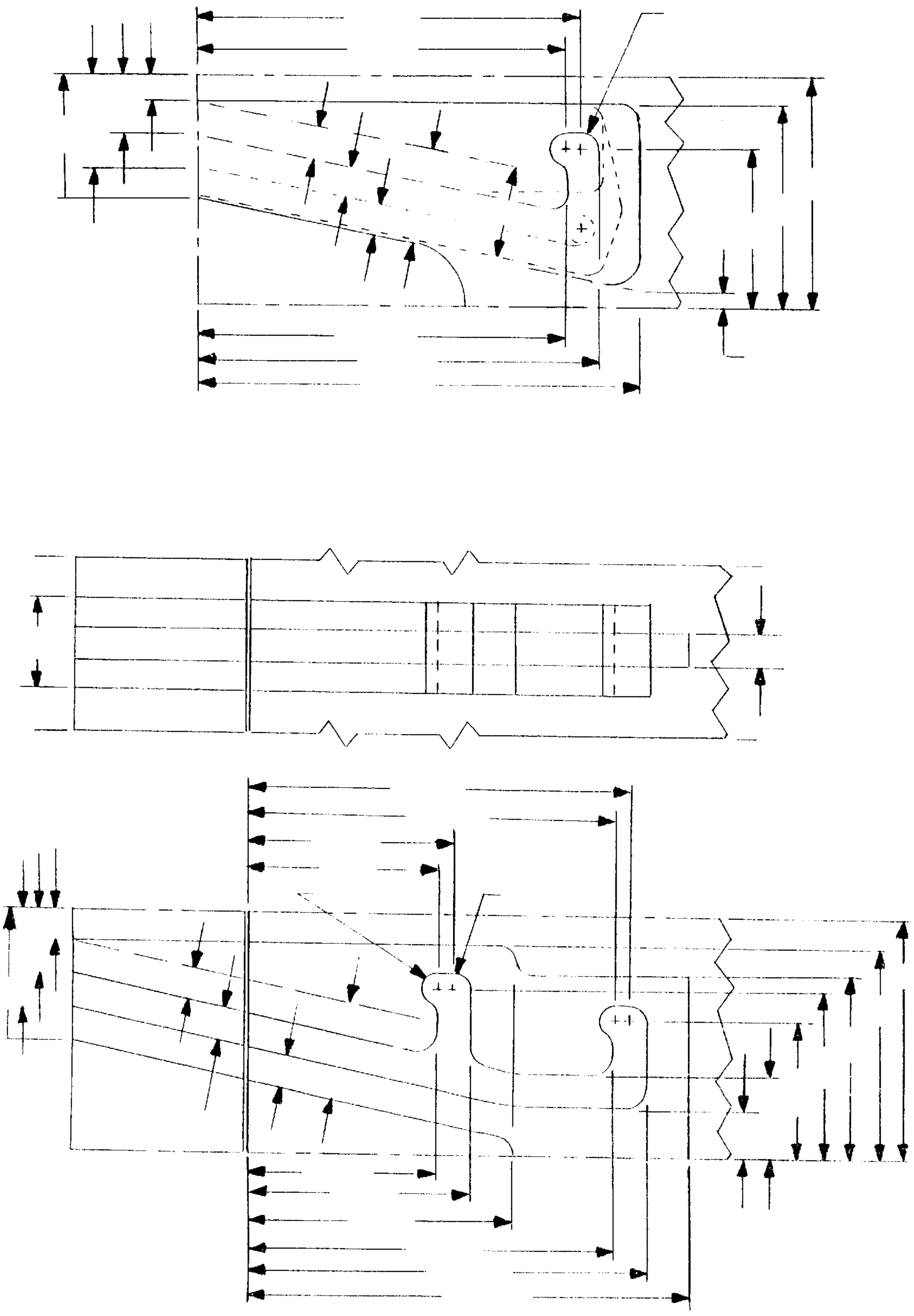
FIG. 24 is a diagram of the two slot designs, the single slot and the dual slot, used in the main embodiment. The measurements are exact according to desired clearances/tolerances for the bar slight variations may occur for different embodiments.
Figure 25:
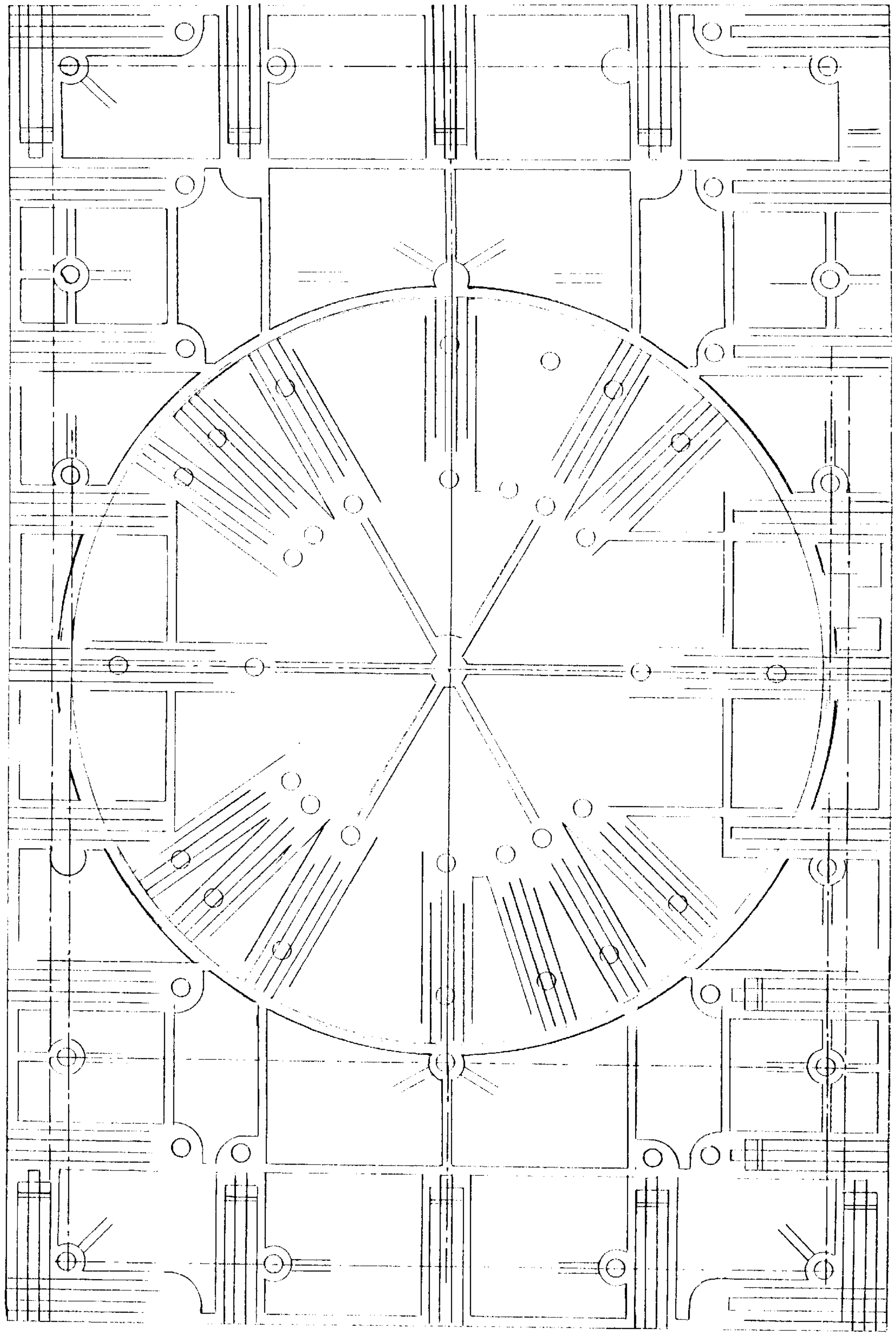
FIG. 25 is of the work surface of the "Handy Table", (main embodiment), as seen as if the top were transparent.

FIG. 22 FIG. 22 is not part of the main embodiment, but is an illustration of a variation of the invention. This particular application is not as complicated as the main embodiment, but is designed for constant, everyday shop use. It is still the bar and slot design but coupled with a different way of using it. As I said before, I have worked in furniture shops and very often parts need to be put together. Some are guled and doweled or some are simply screwed together. In all instances, holding the objects in place has always been a chore and required 2 people or more for bigger objects. What is shown here, though not in great detail, is a shop application of the invention.

The top illustration shows a typical work surface with some modifications that turn it into a clamping/securing system. On top of the work surface is shown a #136 design clamp unit coupled with a #138 design clamp unit. The "post" of unit #138 is shown protruding through the table surface and into a support unit I will call an "under surface clamp mount base", (for lack of a better description). Mass production is common in a furniture shop of several item or components of a desk, or book cases, etc. The user needs very little to incorporate this system to an ordinary table with "3" basic requirements. (1) The underside of a work surface must be like the top side, that is smooth and with no obstructions. Most work surfaces are that way with the exception of an occasional cross support. (2) The table top has to have a "lip" or overhang of three inches on any or all sides the user wants to mount a clamp system. This overhang is the clearance from the rail towards the outer most part of the surface. By rail, I mean part of the table frame that supports the surface and runs from leg to leg. (3) The table work surface should be one inch thick, if a wood or similar composition is used, or "webbing" would have to be used if thin sheet metal is used for the surface. A track can be attached to the under side of the over hang and to the rail to form a "cavity" for the slot housing that will "ride" in the track. A bar can be inserted into the slot housing, a clamp unit on the bar, and just slide the slot housing to match up with the desired surface mounted clamp unit. The user can drill a hole in the surface wherever desired and in fact, several of them. However, there must be a six inch clearance between holes. With the adjustability of the clamp units, there is no problem with the holes being six inches apart. You simply install a under surface clamp mount base, lined up with the hole and screw it to the under side of the work surface. Several of these can be set up on one surface. The tracks can be cut to any length or even separated anywhere along the edge. Several slot housings can be used in the same track with as little as three inches clearance between them. The lower illustration shows how the application would work from an end view of the work surface.

Because of the constant use this system is designed for, the bars will be slightly bigger and of course, the slot will also be slightly larger. This also means a larger clamp size for strength. This shop application of the invention shows one of many embodiments or ramifications of the invention.

FIG. 23 This set of details shows the design of the slot housing. (A) Shows a right side view. At the top left is the "L" shaped track rail opening. The lower right shows the other opening for the other "L" shaped track rail. The two small rectangular shaped broken line "boxes" indicate a tab for lining up the two halves. (this slot housing will be in two parts, a left and a right side). The opening on the bottom between the second and third hole,(from the left), is for clean out purposes. In case any foreign matter gets clogged in the slot. The longer broken lines represent the cavity of the bar. The smaller broken lines represent the travel of the roll pin, which is at one end of the bar, just like in the main embodiment. The difference here being a larger bar and roll pin. The five solid little circles are the screw holes for connecting the two halves. The upper, larger broken line circle represents a ball bearing, (two of these), which aide the slot housing's slide along the track. The small broken line circles at the bottom right are also ball bearings, (four of these), which ease sliding of the housing on the other "L" shaped rail. The angle of insertion of the bar is approximately 10 degrees.

(B) Shows the track from an end view. The broken line shows how the slot housing fits into it. The length of the sides, from the top right corner, is an equal distance. The "L" track rails are also the same size. This is more for ease of production of parts than anything else, but the design is sound for what it is suppose to do.

(C) Shows a top view of the slot housing with the open/entrance side facing the left. From this view you can see how the. "tabs" work to line up the halves for screwing them together. Also is shown the placement of the ball bearings as seen from the top. Also shown is the thumb screw hole. The thumb screw locks the slot housing anywhere the user wants it.

(D) Shows the track with the slot housing in the track, from a top view. This shows how the upper ball bearings roll along the edge of the upper "L" rail. This also shows the slot for the bar and the roll pin in broken lines, one half of each in each side.

(E) Shows the slot housing from the back end. This is the end that faces the table rail, inside the track, though. The opposite of the open end. This shows the housing as screwed together.

(F) Shows the slot housing in two pieces. It shows the tab and groove, the bar opening, The grooves for the "L" rails and also the ball bearings and the thumb screw hole. Item #214 are horizonal track ball bearings. Item #216 are the vertical track ball bearings. Item #218 are the screw holes for connecting the two halves. Item #220 is the thumb screw hole. Item #222 are the "L" rails for the track. Item #224 is the track, made of angle iron or an aluminum alloy. The product's strength will determine the thickness of this track. This concludes the Figures. I hope this sufficiently describes the main embodiment of the invention and more, with the shop application information.

Operation of the Invention

The operation of the invention is based on the bar and slot design and the way the two work together. When this is incorporated into the main embodiment, it becomes the basis for a clamp or securing system. When used for shop application some of the abiltiies of the main embodiment are lessened, but this is by design. In the many different ways or ramifications that this invention can be used, different industries can benefit.

The operation of the invention, especially in the main embodiment is of a bar being slipped into a slot at about a 10 degree angle. The travel is about 3 inches. At this point, it "bottoms out" then the point of entry becomes a pivot point. The remaining part of the bar that sticks out of the slot is pushed down to a level, (or close to it), position. Since the slot is designed to house a roll pin, which is placed, centered at one end of the bar, (see FIG. 3), in the bar, the inserted bar follows the direction of the path of the slot. You can see in FIG. 3, the path the bar and roll pin follow. At the end of this path, which swings up, there is a slight indentation slightly larger that the size of the roll pin back towards the direction of the entrance point. This "seats" the roll pin. Now the bar is in a position where pull force can be applied away from the entrance of the slot. On a common bar or pipe clamp, this is the pull force used to hold an object while a screw is used to tighten against an object. The principle is sound and this invention simply takes this and uses it in a new way. Man has been pulling or pushing on objects for thousands of years to make this action do specific things for him and this invention brings in a new way of doing this.

The action I've described thus far only does one thing, and that is to put a bar in a slot and in such a way that it doesn't fall out and that force can be used on it now to accomplish a goal. The goal can be a means of connecting one object to another, holding an object by means of placing counter parts on the bar and on the part the slot is incorporated in and using some sort of a clamping mechanism, or a quick way of hanging something up where the action of removing the object can be just as quick and easy. Examples of the invention application would be a way of hooking up a tow chain or strap by means of a frame mounted slot that can inexpensively be attached to any vehicle, then the strap with a short bar, (with roll pin in it), on each end can be stored in the vehicle until needed. A method of hanging cabinets or tool racks, etc., on walls of industries where the occasional moving of these items is beneficial. With such a system, this moving around of equiptment can be easy and inexpensive. This invention can be used as a means of applying lines, such as clothes lines or temporary fencing indoors or outdoors, such as apartment clothes lines or sectioned off areas of a museum. Things that need to be put up or taken down quickly and easily.

The particular way the bar and slot is used for the main embodiment of the invention is to provide a wide variety of ways to clamp, secure, or simply hold an object that needs to be worked on, especially when there is no one around to help you.

The top part of the main embodiment I refer to as the work surface. This is where most all the action will take place. It is approximately 32 inches long by 21 inches wide, (front to back). This top is in three sections for a specific purpose. It can provide a "one" piece work surface of the above stated size or it can be extended to hold larger objects if neccessary. It is designed so that two of the three sections can be removed, the left and right sections, to allow use of the center section which is a circle approximately 18 inches in diameter. This circle has special abilities. Before we get to this, lets look at the edges of the work surface as a whole. This is the two inch thickness of the work surface. The front and the back have nine slots each, with the center slots, front and back, being halved because this is where the left and right sections seperate, when this action is desired. (see FIG. 4 ) The end sides of the left and right section have five slots each, giving the outer edges of the work surface a total of 28 slots, as per design of this main embodiment. This is not to say that this can't be changed because other models of different sizes may be developed depending on where a perceived improvement of design may be prudent.

The center section, when the left and right sections are removed, also has slots. (see FIG. 4) These slots are set up in specific positions. The reason is to provide exact positions for clamping objects having 3, 4, 5, 6, and 8 sides. I chose to have slots for these specific sided objects because they are the most commonly used. However, the design of the clamp units and how they interact with the work surface, meaning, using the holes on the surface,(not the slots), enable any abstract sided object to be secured when the slots won't allow this. There are 16 slots available for the center section. The center section isn't fixed in position. It has the ability to rotate a full 360 degrees. If you are working on an object, standing in front and you need to get to the opposite side of the project, the user just has to push up on the far right lever that releases a pin. (The pin is part of a pivot arm, FIG. 14, item #172, that keeps the center section from turning when working on a project.) Then the user turns the object to the desired side to be worked on and releases the lever to lock the center section into its new position. Once again, the left and right sections must be removed in order to take full advantage of the versatility of the center section.

The three sections have a total of 72 surface mount clamp holes. These holes are designed to allow a clamp unit to be placed in them for the purpose of securing an object to the surface. The ability of the surface design lets slots and holes work together or independently to form well over 100 combinations of securing one or more projects to be worked on. This ability of the work surface is enhanced by the adjustability of the clamp units. FIG. 7 show only a few of the combinations available.

I need to cover the turntable at this time. The turntable is illustrated in FIGS. 4, and in 14. The turntable is 12 inches in diameter with a center hole of 6 9/32 inches. It is designed to attach to two different surfaces. It is ball bearing loaded and has a 1,000 pound capacity, though that much weight will not be recomended. There will be two weight capacities. Because of the invention's ability for the work surface to tilt, the load limit when tilting capability is used will be approximately 150 pounds. when the work surface is locked in the level position, the load limit will increase to about 400 pounds.

There is one other feature concerning the center section. It is the "random lock" for the center section and is incorporated in the work surface. It is shown in FIG. 5. There are two of these, near the center, one at right/front and tight/rear. Since these sections are identical, this devise is accessable in front or back, and when the surface is level or tilted. This devise enables the user to lock the center section at a specific degree, ie., at 193 degrees, if the user so desires to find this angle. Again, the center section can lock by means of the 5 degree increment lock mechanism, which also locks the circle at specific increments for the previously stated positions for 3, 4, 5, 6, and 8 sided objects. The random lock is for greater precision. The 5 degree incriment lock will be discussed when we get to the work surface frame which houses the 5 degree lock lever and mechanism.

Another feature of the work surface is the "view window". This is shown in FIG. 21. The purpose of this feature is to provide the user with being able to see at what degree he/she is locking the center section at. There are two of these view windows one in front and one in back. The one in back also becomes a view from the top when the surface is tilted, if desired to be. The center section has degree numbers on it in two directions, both on the top and around the circumference. This is for adjustment knowledge of the center section when the three sections are as one unit or when the center section is used by itself. It just provides four ways of knowing where you are setting the circle, degree wise.

Along the front and back of both left and right sections is a "track" item, which is angle iron, (or aluminum), which allows the left and right sections to slide away from the center section to extend the surface or remove either section. Locks mounted in the work surface frame control this movement. See FIGS. 1 and 2.

I want to go to the clamp units at this time because they work with the work surface. The clamp units, (FIG. 9,-A, B, and C), are designed to work with each other and on the work surface or from the edge by means of the bars and slots, or both ways. In addition to this, the clamp units can be used apart from the work surface as bar clamps, because of their versatility. FIG. 7 is best suited for showing the versatility of these units. FIGS. 9, 10, 11, 12, and 13 give details of these clamp units. FIG. 9-A is unit #142. The screw and clamp face housing is vertically adjustable and can be secured to the desired height by means of a thumb screw. The "cap" which is secured to the top of the two vertical members keeps the housing from being pulled off. The screw and clamp face work like any other product designed for use of tightening onto an object. At the base of this unit you will see that there is a rectangular through hole that will house the bar. The bar can be used in two ways. It can lock to the unit by inserting the bar into the unit and using the locks, (FIG. 11), or the bar can slide completely through, and the unit #142 can be controlled by the "common" unit, #138. The common unit, (shown in FIG. 9 to the left of unit #142), allows unit #142 to slide and lock anywhere along a bar, or allows the unit to be inserted into a surface mount hole, (when the #142 unit is locked to a bar). Either way, unit #142 is controlled by the common unit, but the way it is controlled, on the surface or from a slot, is the user's choice. FIG. 11, in the back view, a thumb screw is shown. This allows the vertical members, that hold the screw/clamp face housing, to be removed in case an optional, longer or shorter set of vertical members is desired/needed for a specific job that the regular vertical members will not handle. Again, longer or shorter vertical members will be an option for the invention. The standard lengths will come with the product. Also shown in FIG. 11 is how the bar, when desired to be locked into unit #142, can only be locked in from the back of the unit. You can also see, at the upper back of the unit, the catch which enables the common unit to lock to unit #142. Because of the snug fit of the bar in the units, this catch along with the unit coupler, is all that is needed to secure one unit to the other.

FIG. 9-B is the counter part to unit #142. 9-B is clamp unit #136. It operates with the common unit, (#138), pretty much like unit #142 does. The difference in the two units is the way the clamp face adjusts. The clamp face can be used on either the "front" or "back" of the unit. For instance, see FIG. 7, examples B and C. This shows the versatility of this piece, its height adjustment and its reversability. FIG. 13 shows how it can be locked on to the end of a bar, or, by means of the catch, how it can attach to a common unit. Shown also are different views of the clamp face, and the slide lock, for locking the unit to a bar. An option or accessary is also shown here which are clamp face adapters. These are designed for corner clamping, having an inside corner "face" and an outside corner "face". There will be other clamp face options as well, with various capabilities. The options will be adaptable to all the units.

FIG. 9-C is the "common" unit #138. This unit houses the bar lock lever which locks the unit along the bar wherever desired. It also houses, on top, in front of the bar lock, the unit coupler. The unit coupler is spring loaded and one end of it slips down over the "catch" of a desired unit, either unit #142 or unit #136. Unit #138 is also equipped with the post which works with the work surface by means of the surface mount clamp unit holes. The post is designed to slip into the hole and screw in, ¼ to ¾ of an inch, depending on whether or not the particle board surface is used on the work surface. Again, the particle board surface is used as an option to keep a user from damaging the work surface by abuse. A particle board application is shown in FIG. 7. Anyway, because the unit is able to turn in any direction, it can adapt to any object's shape. This common unit can also serve as a "stop" on the work surface. (See details of FIG. 13).

There is one other clamp unit that is a combination of unit #142 and a common unit. This one bodied unit shown in FIGS. 10 and 12 is unit #144. It has all the features of the other three units combined, but it operates slightly differently. FIG. 10 shows a 3-D view of the unit. Note the "cap" is also the screw and clamp face housing and is attached to the vertical members. The thumb screw allows the height adjustment. The length of the vertical members is slightly different and the clamp face must be raised up fully in order for this unit to work on the surface of the invention. In this unit, the bar must be slid all the way through the base of the unit. The bar, at the roll pin end, does not attach to the unit. This unit is still adjustable by means of the bar lock and the screw. All of the screws have a tightening cross bar inserted in the back end for leverage of tightening. FIG. 12 shows different views of this unit and its adjustment capability. Note the bottom of the vertical members being slightly wider at the bottom. As one looks up the line of travel, inside the base of the unit is a "stop" that this wider section will catch against, keeping the vertical members from being pulled out, (side view). The cavity for the bar lock allows for movement of the spring which keeps the bar lock gripping the bar. I hope this segment answers any or all your questions concerning the clamp units, the top, or work surface, and how they work together.

I go now to the next part of the invention, which interacts with the work surface, the work surface frame. This is best shown in FIGS. 4 and especially 14. In FIG. 4, the work surface frame is shown with the turntable attached to it, and in a 3-D view. If you look closely, you can see that the perimeter angle iron pieces set up higher than the inner structure. This is because the turn table is $\frac{5}{16}$ inch thick and in order for the center section and the left and right sections to match up, height wise, the inner structure of the work surface frame had to be lowered, down from the perimeter angle irons by $\frac{5}{16}$ of an inch. All these angle irons are 1¼ by 1¼ by ⅛ inch, and what ever length they need to be, respectively. The angle iron pieces that are at a 45 degree angle, to the "cross" of the inner structure, are support for the turntable and the weight distribution of whatever object is being worked on. In FIG. 14, there is a top view of the work surface frame and all the working parts or items that control operation of the work surface. FIGS. 1 and 2, along with FIG. 14 help show the placement of the levers. Two levers, seen from the side of the frame, look like "whales". This was an accident in design, but I decided to leave these like this. It may help with my explanation. Anyway, these two levers, as seen from the front side, are for expanding the left and right sections of the work surface or removing them altogether, one at a time or both at the same time. The rods that they are connected to, run from front to back. On the back are matching levers. This is so they can be operated if the work surface is in a tilted position. These levers are spring loaded, both front and back. These are levers #158 and #162.

The next lever I will discuss is the "tee" handle or lever. It is placed just slightly to the left of center. A rod connects this to a plunger. When the "tee" handle is pulled, the plunger is disengaged, releasing the work surface frame, (also the work surface), from the upper frame-work. This in turn, allows the work surface frame to be tilted to a desired position and secured with the tilt rod lock. (to be described later). The "tee" handle is item #160.

Item #164 is the lever that controls the 5 degree locking movement of the center section. It also controls the specific position settings for a 3, 4, 5, 6, and 8 sided objects. All of these holes for this operation are in the bottom of the center section, around the perimeter. In between the front and back of the frame, lined up to access these holes just described, is the pivot arm. When lever #164 is pushed up towards the work surface, it releases the pin of the pivot arm. which allows the center section to turn. Upon releasing pressure of the lever, the pin of the pivot arm will lock into the position the user desired. This is how the operation of rotation of the center sections works. Again, for specific desired degree, the random lock lever on the front, (or back), of the work surface side, is used. It uses a screw with a "clamp face" that tightens against the center section.

FIG. 5 shows the center section random lock, and its cavity.

FIG. 15 shows the tilt lock plunger handle or "tee" handle. It is item #170. On the opposite end of this is item #168, the plunger that is operated by item #170. These two illustrations give a close up of how the operation would work.

FIG. 16 Gives a close up of items #158 and #162, the left and right section extension levers. The first illustration shows an end view of the lever and how the rod attaches to it. The next illustration shows the "whale" resembling lever from a side view. Every one is spring loaded. When pushed up towards the work surface, the pivoting action releases the pin, thereby releasing the left or right section to be extended or removed completely.

FIG. 17 This is item #172 as shown in FIG. 14 and here in some close ups. The first illustration is a side view of the pivot arm, looking at it from the front/side. In this drawing you can see that the pin is longer than the others because it has to span the 5⁄16 void of the thickness of the turntable and penetrate the holes in the bottom circumference of the center section as well. A tortion spring is shown around the rod. The alternate position is shown in a broken line. The next View shows the item #172 from a top view, and transparent, to show the workings of it. Note how the spring is bent in an "L" shape and penetrates the side of the angle iron while the other side of the spring penetrates inside the top of the pivot arm. When lever #164 is activated, it pivots the pivot arm, lowering the pin and releasing the center section to turn to a desired position.

The next illustration is of Item #164, the 5 degree increment look lever. FIG. 14 shows an overall view of what it does and looks like connected to its counter parts. This view is an enlarged side view of the lever and shows its alternate position. Note its shape as compared to the other levers. The angle iron shown in this view shows in broken lines, a hole in the "flat" part of the angle iron, just slightly right of the circular portion of the lever. The design of a right or left section of the work surface calls for a clamp unit hole placement here and it had to penetrate through the work surface frame at this point. The lever also had to be here, so, the lever had to be shaped this way to accomadate for the length of the post of a #138 clamp unit. Even when the lever is operated, it still clears the post if one is inserted in this particular hole. There are 4 such situations in the work surface. The last illustration simply shows a top view of the lever and how it attaches to the rod.

We come to the upper frame-work which is pictured in FIG. 18. This is basically a structure that supports the work surface and the work surface frame, for purposes of weight and movement. It is designed to hold/support 400 plus pounds when the work surface is locked in a level position. When the work surface is tilted, the load limit is around 150 plus pounds.

I will have a section in the operator's manual for this invention that will cover safety of operation, especially when it comes to a project's height in relation to the tilt operation. In checking this particular movement to see what size and height of an object would cause the invention to become off off balance and therefore fall over forward, I found that an object can't be over 12 inches in height and weigh more than 150 pounds. When I begin, actually before I begin manufacturing, I will test more thoroughly the actual limits and seek the Underwriter's Laboritories approval, and be able to set disclaimer if legally neccessary. In other words, I will be very safety conscious of this invention for the concern of the consumer as well as my own.

The frame-work that will fit around the work surface frame is of 1¼ by 1¼ by ⅛ hot rolled, angle iron, steel. The two shorter pieces will run from slightly past center of the left and right sides of the work surface frame, to the back of the left and right sides. At this point they will be joined by another angle iron piece that runs along the back of the frame, inverted (see FIG. 15, second illustration as well as FIG. 18) so that the work surface frame "rests" on the inverted angle iron. (see FIG. 18, the long angle iron across the back). Close to the middle of this angle iron is a short piece of angle iron welded to it. This piece with the hole in it is the plunger slot. FIG. 15 shows the plunger protruding through this piece. This locks the work surface in the horizonal position. This slot is item #169. There are two upper leg sleeves that the shorter angle irons are attached to, (item #186), and these are joined together by a panel. This panel, (item #180), has a support bracket attached to it near the center, (item #182). This support bracket serves more than one function. (1) Part of it, the air spring attaches to at the bottom outside. (2) The upper top area supports a hollow sleeve that houses the pinion gear. The sleeve is hollow to support the crank rod, (item #174), in the middle. The pinion gear, (item #192) will mesh with the curved rack gear, (item #190). (3) The bracket also supports the panel and acts as a sway brace between the two upper leg sleeves that, in turn, supports the work surface. Other features of this upper frame-work are as follows. The tilt rod locks, located on the top front of the upper leg sleeves, (item #194) are for tightening the work surface at the desired tilt position. The lever will only have to turn a "quarter" turn. When the work surface is in tilt mode, the curved rack gear is cranked by means of the pinion gear, which is attached to the crank rod, which is cranked by the tilt crank handle, (item #176, one on each upper leg sleeve, supported by item #188, the crank rod brackets). The action of cranking the pinion gear pulls the front of the work surface down by means of the curved rack gear. The air spring,(item #184), is the counter support to this action. It keeps the gravity of an object being worked on, when tilting, from falling out of control. The air spring is rated at 150 plus pounds of holding force. This and the pinion gear with its companion parts, enables the user to easily control the tilt action and lock the work surface at any chosen angle or degree. When the tilt rod lock is tightened, the work surface remains where desired until a change is needed. The user controls the tilt feature completely.

There are two height adjustment levers, (item #178), which are located on the side of the upper leg sleeves towards their bottom. They are on the-outside for ease of use. These lock into the legs of this embodiment, (FIG. 20). On the back and bottom of the upper leg sleeves is a little devise I call the leg lock. Its one purpose is to let the user know when he/she is running out of "leg room". A little hole is drilled into the back- top of the leg at the right position so that it will stop the leg from being pulled out when a user tries to adjust the work surface too high. When the leg is extended to the point of where the leg lock catches that little hole, the user is stopped from going any higher. In FIG. 19, this side view of the upper frame-work shows the work surface frame attached to it and in broken lines is shown a fully tilted position. Also shown in broken lines is the extension and movement of the air spring. One can also see the attachment points of the top of the air spring and the curved rack gear. There is also a side view of the tilt lock lever, (item #194.), that may show its function more clearly. When the work surface is tilted, the degree indicator shows the user what degree the surface is being tilted to. There is also a triangle brace shown welded between the upper leg sleeve and the angle iron that the work surface frame rests on. Note the spring load in the height adjustment lever. This will be a torsion spring.

In describing how the leg section works, I need to say that some of its parts are already manufactured, but not the bracket that aide raising the horizonal cross member; that lowers the wheels. The floor glides are already manufactured, but will have to be welded to a threaded "tee" handle. FIG. 20 shows two views of the caster brackets. Item #196, the leg, will probably be of extruded aluminum. It will be drilled on the outside in ½ inch increments in the center of the leg. These holes will line up with the height adjustment levers. Note also, the triangle brace behind the lower leg sleeve. The front horizonal section telescopes out into operating position and back for storing when the table is not in use. This, plus the tilting top make the invention easier to store.

I now will go to a variation of the invention which is a shop application. The bar and slot is still the basis of the design. The difference is that the slots that are fixed in the "Handy Table" at specific places will not apply to the shop version. Instead, the slot will be a movable unit that will travel along a track. (see FIGS. 22 and 23.) What my design does is allow a work surface, a table if you will, to become a clamp system. In working in a furniture shop I've had first had experience at assembling furniture components and it is sometimes awkward to do. I believe this design lessens that problem and enables one person to do more with less physical human help.

The work surface in question only needs a few specifics to adapt to this system. A "track", (item #212), tan be installed around the perimeter of any table having a "lip" or over hang of 3 inches, and a rail of at least 2½ inches. Most tables have this vertical rail under the top as support for the top and for the legs to attach to anyway. When a track is attached under the overhang and to the rail, a slot unit can be slid in from either side and locked in place by means of its thumb screw wherever desired. Usually, it will be lined up with its counter-part in the table surface. The counter-part consists of item #210, an under surface clamp mount base, and a chosen clamp unit can be inserted into it. The holes will be drilled where the user desires them, for the purpose intended. The "USCM" base it screwed to the under surface of the table and lined up with the hole. One requirement is a 6 inch radius clearance from the center of one hole to the center of the next. With the broad capabilities of the clamp units, almost any object of any size can be secured, depending only on the size of the work surface. Several holes can be drilled and several "USCM" bases can be installed to tailor a table for a variety of uses.

The "track" and "slot unit" are described in FIG. 23. (A) The slot cavity is much the same as the slot of the "Handy Table", but tailored for use in the track and for a larger bar and roll pin. The larger broken lines are the bar cavity. The smaller broken lines are the roll pin "travel". The two rectangular broken line areas are tabs to line up the two halves of the unit for assembly. (B) This shows the track and how the slot unit slides in it. (C) This top view shows the grooves for the track rails, the screw holes and the placement of the ball bearings. (D) This is atop view of a slot unit in the track. (E) This is a back view of the slot unit. (F) This front view shows the slot unit separated and slows the thumb screw hole.

Hopefully, this has been sufficient information for description and use of the invention. This concludes the "Operations" section of this application.

Conclusion, Ramifications, and Scope of Invention

To the reader; I submit that this invention and the main embodiment herein described is a potential product that is user friendly and versatile, and certainly be of benefit to a variety of industries and to the home owner. It can be useful to almost any age group, male or female alike.

I believe the main embodiment, as well as other ramifications, are sound in design and are able to accomplish what is stated in this patent application. The scope of the invention is only limited by the user's imagination.

The shop version is only one other ramification of this invention. Other possibilities would include a much larger version for industries that work on much larger projects. This variation could utilize hydraulics or electronics. Another would be a smaller version that is portable and can mount to any table surface.

There are many possible accessaries that can and will be made for one or more variations of the invention. Things such as toggle clamps, clamp face adaptors, accessaries that enable the invention to carry objects, a section that slides—added to the surface. A way to mount the unit to the tailgate of a truck.

Other ramifications could be the following;

1. A means of hanging wall cabinets in the home, shop or office, making the cabinets easily removable for remodeling, expansion, etc. This system would work well with office panels.
2. A means of towing. The slot end can be attached to the frame easily as in an emergency situation. The bar ends can be attached to a rope, cable, or strap, forming a quick hook-up system.
3. A means of hooking together wall sections, floor sections, fencing, gates, even a means of allowing movement in floors of buildings, reducing stress in case of earthquakes.
4. A means for connecting accessaries to machines or tools used for gardening, landscaping, farm impliments, or attaching one tool to another, enhancing its use.
5. A means for lifting objects for movement from one place to another.
6. An all around means of joining, hanging, securing, clamping, connecting any object large or small, to another. Only slight modification need be made in its design for this invention to accomidate many purposes.

The main embodiment is not locked into rigid operation perimeters or description by any means. For example; the top of the "Handy Table" can vary in size and shape for a special application. The top can be made of more than one type of material. Carbon fibre, for example is probably strong enough, but the cost of manufacturing will determine this. So will safety considerations. The clamp units may be improved in design or altered to be used for very specific purposes. There may be a variety of colors for the invention based on consumer desire or special use. There may be special changes in height adjustment capability to tailor to a certain kind of shop application. There will be special kinds of accessaries/adapters that will enhance the job possibilities. In some models, power tools may be integrated into the surface or the surface adapted to house one or more if so desired. Even if only the main embodiment was the invention, this alone would be of benefit to the consumer.

While my above summary contains many specificities, these should not be construed as limitations on the scope of the invention but rather as an exemplification of one preferred embodiment thereof. The scope of the invention is illustrated by the up coming claims and their legal equivalents.

I claim:

1. A clamping apparatus, comprising:

a housing having a horizontal aperture extending completely through the housing from a first end surface to a second end surface, a pair of parallel vertical apertures extending completely through the housing from a top surface to a bottom surface, an additional aperture extending into the housing, and a first horizontal threaded aperture extending into the housing and communicating with one of the vertical apertures;

an apertured plate extending into said additional aperture, wherein the apertured plate is movable between a first position, in which the apertured plate extends generally vertically, and a second position, in which the apertured plate is canted relative to vertical;

a horizontal bar slidingly engaged within said horizontal aperture and extending through the aperture of the apertured plate;

a spring located within said additional aperture, wherein the spring biases said apertured plate into said second position at which portions of said apertured plate defining an upper and lower edge of the aperture of said plate, respectively, abut against upper and lower surfaces of said horizontal bar, respectively, such that said horizontal bar is locked in position relative to said housing, and wherein when said plate is moved into said first position the portions of the apertured plate become spaced relative to the upper and lower surfaces of said horizontal bar, such that said horizontal bar becomes unlocked and freely slidable within said horizontal aperture relative to said housing;

a vertical bar slidingly engaged within each of said vertical apertures, respectively;

a cap connected to an upper end of each of said vertical bars, whereby the cap interconnects said vertical bars to one another, and wherein the cap has a second horizontal threaded aperture extending completely through the cap from a first end surface to a second end surface;

a thumbscrew threadably received within said first horizontal threaded aperture, wherein the thumbscrew is threadably advanceable to a first location at which the thumbscrew abuts a side surface of the vertical bar slidingly engaged within the vertical aperture with which the first horizontal threaded aperture communicates, such that the interconnected vertical bars are locked in position relative to said housing, and wherein the thumbscrew is threadably retractable to a second location at which the thumbscrew is spaced from the side surface of the vertical bar, such that the interconnected vertical bars become unlocked and freely slidable within said vertical apertures relative to said housing; and a screw rod threadably received within and extending completely through said second horizontal threaded aperture, wherein the screw rod has a clamp face connected to one end thereof and a handle connected to an opposite end thereof.

2. The clamping apparatus of claim 1, wherein said clamp face has a substantially circular shape.

3. The clamping apparatus of claim 1, further comprising an attachment rod having a first end interconnected to the bottom surface of said housing, and a second end which is adapted for interconnection to a work table.

4. The clamping apparatus of claim 3, wherein said second end of said attachment rod is threaded.

5. The clamping apparatus of claim 1, wherein said bundle comprises a rod extending through an aperture in said opposite end of said screw rod.

6. A clamping apparatus, comprising:

a housing having a horizontal aperture extending completely through the housing from a first end surface to a second end surface, a pair of parallel vertical apertures extending completely through the housing from a top surface to a bottom surface, an additional aperture extending into the housing, and a first horizontal threaded aperture extending into the housing and communicating with one of the vertical apertures;

an apertured plate extending into said additional aperture, wherein the apertured plate is movable between a first position, in which the apertured plate extends generally vertically, and a second position, in which the apertured plate is canted relative to the vertical;

a horizontal bar slidingly engaged within said horizontal aperture and extending through the aperture of the apertured plate;

a spring located within said additional aperture, wherein the spring biases said apertured plate into said second position at which portions of said apertured plate defining an upper and lower edge of the aperture of said plate, respectively, abut against upper and lower surfaces of said horizontal bar, respectively, such that said horizontal bar is locked in position relative to said housing, and wherein when said plate is moved into said first position the portions of the apertured plate become spaced relative to the upper and lower surfaces of said horizontal bar, such that said horizontal bar becomes unlocked and freely slidable within said horizontal aperture relative to said housing;

a vertical bar slidingly engaged within each of said vertical apertures, respectively;

a cap connected to an upper end of each of said vertical bars, whereby the cap interconnects said vertical bars to one another, and wherein the cap has a second horizontal threaded aperture extending completely through the cap from a first end surface to a second end surface;

a thumbscrew threadably received within said first horizontal threaded aperture, wherein the thumbscrew is threadably advanceable to a first location at which the thumbscrew abuts a side surface of the vertical bar slidingly engaged within the vertical aperture with which the first horizontal threaded aperture communicates, such that the interconnected vertical bars are locked in position relative to said housing, and wherein the thumbscrew is threadably retractable to a second location at which the thumbscrew is spaced from the side surface of the vertical bar, such that the interconnected vertical bars become unlocked and freely slidable within said vertical apertures relative to said housing; and a first screw rod threadably received within and extending completely through said second horizontal threaded aperture, wherein the screw rod has a clamp face connected to one end thereof and a handle connected to an opposite end thereof;

a second rod having a first end connected to the bottom surface of said housing, and also having a threaded second end extending downwardly away from the bottom surface of said housing; and a work table having a substantially planar upper surface with a plurality of threaded apertures extending from the planar upper surface into the work table, wherein the threaded second end of said second rod is removably threadably engageable with each of the plurality of threaded apertures extending into the work table.

* * * * *